(12) United States Patent
Houle

(10) Patent No.: US 6,513,921 B1
(45) Date of Patent: Feb. 4, 2003

(54) LIGHT SENSITIVE INVISIBLE INK COMPOSITIONS AND METHODS FOR USING THE SAME

(75) Inventor: William A. Houle, Encinitas, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/569,517

(22) Filed: May 12, 2000

Related U.S. Application Data

(62) Division of application No. 09/181,581, filed on Oct. 28, 1998.

(51) Int. Cl.$^7$ .............................. B41J 2/17; B41J 2/01
(52) U.S. Cl. .......................................... 347/96; 347/100
(58) Field of Search .......................... 347/100, 96, 101; 106/31.14, 31.15, 31.58

(56) References Cited

U.S. PATENT DOCUMENTS

| | | | |
|---|---|---|---|
| 4,243,694 A | 1/1981 | Mansukhani |
| 4,329,698 A | 5/1982 | Smith |
| 4,500,895 A | 2/1985 | Buck et al. |
| 4,529,688 A | 7/1985 | Law et al. |
| 4,540,595 A | 9/1985 | Acitelli et al. |
| 4,749,291 A | 6/1988 | Kobayashi et al. |
| 4,771,295 A | 9/1988 | Baker et al. |
| 4,816,386 A | 3/1989 | Gotoh et al. |
| 5,093,147 A | 3/1992 | Andrus et al. |
| 5,215,838 A | 6/1993 | Tam et al. |
| 5,278,584 A | 1/1994 | Keefe et al. |
| 5,282,894 A | 2/1994 | Albert et al. |
| 5,292,855 A | 3/1994 | Krutak et al. |
| 5,296,023 A | 3/1994 | Gregory et al. |
| 5,301,044 A | 4/1994 | Wright |
| 5,336,714 A | 8/1994 | Krutak et al. |
| 5,348,348 A | 9/1994 | Hanada et al. |
| 5,397,819 A | 3/1995 | Krutak et al. |
| 5,423,432 A | 6/1995 | Krutak et al. |
| 5,478,381 A | 12/1995 | Ohiwa et al. |
| 5,503,904 A | 4/1996 | Yoshinaga et al. |
| 5,614,008 A | 3/1997 | Escano et al. |
| 5,643,356 A | 7/1997 | Nohr et al. |
| 5,665,151 A | 9/1997 | Escano et al. |
| 5,684,069 A | 11/1997 | Auslander |
| 5,686,725 A | 11/1997 | Maruyama et al. |
| 5,702,511 A | 12/1997 | de Saint-Romain et al. |
| 5,703,229 A | 12/1997 | Krutak et al. |

FOREIGN PATENT DOCUMENTS

| | | |
|---|---|---|
| EP | 468649 A1 | 1/1992 |
| JP | 8218020 | 8/1996 |

OTHER PUBLICATIONS

Hewlett–Packard Journal, vol. 39, No. 4 (Aug. 1988).
U.S. Pending patent application No. 08/869,446 (filed Jun. 5, 1997).
Information Brochure on Tinolux BBS from Ciba (Apr. 10, 1986).
Safety Data Brochure on Tinolux BBS from Ciba (Jan. 4, 1996).

Primary Examiner—John Barlow
Assistant Examiner—Manish S Shah

(57) ABSTRACT

A high-reliability invisible ink printing system is provided which generates high-definition, lightfast images that are easily read or otherwise detected using far red, infrared, and/or ultraviolet light. The inks contain an uncomplexed invisible metal phthalocyanine far red/infrared fluorophore (optimally chloroaluminum [III] phthalocyanine tetrasulfonic acid or salts thereof). An ultraviolet fluorophore can also be included. The inks are invisible to the unaided eye. However, when exposed to far red or infrared light (wavelength=about 650–715 nm) they will fluoresce at a wavelength of about 670–720 nm. If an ultraviolet fluorophore is employed, the inks can also be detected by applying ultraviolet light (wavelength=about 250–380 nm) which results in fluorescent emission at a wavelength of about 400–650 nm. The inks are well suited for delivery using inkjet technology to efficiently form invisible images.

14 Claims, 3 Drawing Sheets

LIGHT SENSITIVE INVISIBLE INK COMPOSITIONS AND METHODS FOR USING THE SAME

CROSS REFERENCE TO RELATED APPLICATION(S)

This is a divisional of copending application Ser. No. 09/181,581 filed on Oct. 28, 1998.

BACKGROUND OF THE INVENTION

The present invention generally relates to ink compositions and delivery systems associated therewith, and more particularly to invisible ink materials which include one or more chemical agents therein that cannot be seen by the unaided eye but will fluoresce when exposed to (1) far red ("FR") light; (2) infrared ("IR") light; or (2) ultraviolet ("UV") light, depending on the particular chemical agents being used. The resulting fluorescent emission can then be detected through the use of a suitable detection system when far red/infrared light is applied or observed by the unaided eye when ultraviolet illumination is employed. The invisible ink compositions have many uses in a variety of different fields and represent an advance in invisible imaging technology.

In recent years, the demand for effective "invisible" ink compositions has steadily increased. Invisible ink materials are traditionally defined to involve a broad class of ink formulations which cannot be seen by the unaided eye when applied to a substrate and viewed with "natural" light (e.g. light from the sun) or light from conventional incandescent lamps and the like. Both of these light forms (as well as other forms which are normally used for general illumination purposes in homes, businesses, and the like) are collectively characterized as "white" light which involves a combination of all the various colored light fractions which fall within a wavelength range of about 300–700 nm. Under these illumination conditions, the ink compositions are essentially colorless. Only after illumination with other, more narrow light wavelengths do the printed images become visible or otherwise detectable (either with or without auxiliary observation equipment).

The uses of these materials are varied and widespread. For example, invisible ink products provide many benefits when printed on a variety of documents including insurance policies, checks, and other related materials. Of particular interest is the use of invisible inks on paperwork prepared by financial institutions (e.g. checks, account statements, routing documents, and the like). These items typically contain a wide variety of routing codes, numerical identifiers, data summaries, and the like which (for numerous reasons including security-related issues) preferably remain invisible to the unaided eye under the conditions outlined above. Likewise, in many applications, it is desired that "bar-coding" for inventory control, product assembly applications in factories, and other comparable purposes be undertaken in a manner where the particular bar-code of interest does not appear in visible form on the products or documents being processed. Representative patents which discuss the use of invisible ink materials for bar-coding purposes include but are not limited U.S. Pat. No. 5,282,894 to Albert et al.; U.S. Pat. No. 5,348,348 to Hanada et al.; and U.S. Pat. No. 5,686,725 to Maruyama et al. Other patents which generally describe the usefulness of invisible ink materials for a variety of different purposes include U.S. Pat. No. 4,243,694 to Mansukhani; U.S. Pat. No. 4,540,595 to Acitelli et al.; U.S. Pat. No. 5,093,147 to Andrus et al.; U.S. Pat. No. 5,215,838 to Tam et al.; U.S. Pat. No. 5,301,044 to Wright; U.S. Pat. No. 5,423,432 to Krutak et al.; U.S. Pat. No. 5,614,008 to Krutak et al.; U.S. Pat. No. 5,643,356 to Nohr et al.; U.S. Pat. No. 5,684,069 to Auslander; U.S. Pat. No. 5,702,511 to de Saint-Romain et al.; U.S. Pat. No. 5,703,229 to Krutak et al., and others.

In addition to the various patents which exist involving invisible ink materials in general, a number of patents have been granted which describe specific approaches for handling and formulating invisible ink compositions. For example, certain references disclose invisible dye compounds which are "complexed" (e.g. chemically coupled or otherwise joined) with a variety of polymeric materials (see U.S. Pat. No. 5,614,008 cited above). The polymers are apparently designed to increase the fluorescence intensity of the dyes. Notwithstanding the benefits associated with this process, the presence of polymeric materials within the completed ink formulations (particularly those that are complexed with the selected dye compound[s]) can diminish print quality levels and reduce overall printer reliability in applications involving high speed/high resolution inkjet printing. This situation can occur because these polymers often form undesired films or deposits within the printing system which interfere or otherwise prevent effective ink drop formation. As a result, images with poor print quality and inadequate edge acuity are generated.

With continued reference to inkjet technology, this approach is of considerable interest in the marking of substrates using invisible inks. Inkjet printing techniques are characterized by a high degree of operational efficiency, low cost, excellent print quality, and rapid ink delivery. Thermal inkjet printing units are especially important in this regard. Printing systems which employ thermal inkjet technology basically involve a cartridge unit having at least one ink reservoir chamber in fluid communication with a printhead. The printhead includes a substrate (preferably made of silicon) that comprises a plurality of thin-film heating resistors thereon.

Selective activation of the resistors causes thermal excitation of the ink materials retained within the ink cartridge and expulsion thereof from the cartridge. Representative thermal inkjet systems are discussed in U.S. Pat. No. 4,500,895 to Buck et al.; U.S. Pat. No. 4,771,295 to Baker et al.; U.S. Pat. No. 5,278,584 to Keefe et al; and the *Hewlett-Packard Journal*, Vol. 39, No. 4 (August 1988), all of which are incorporated herein by reference. Further information regarding inkjet printing devices (including those which incorporate thermal inkjet technology) will be discussed below relative to the present invention.

The invention claimed herein shall be applicable to all types of inkjet printing systems including those which employ cartridge units having a self-contained supply of ink within a housing that is directly attached to a printhead, as well as alternative inkjet systems which use an ink supply that is remotely positioned from the printhead and in fluid communication therewith using one or more conduit members. The claimed materials and methods are also applicable to inkjet printing units using other (e.g. non-thermal) ink delivery methods including those which incorporate, for example, piezoelectric technology as discussed further below.

Inkjet printing techniques and the use of invisible ink materials for the purposes outlined above (and other related applications) offer many important benefits. In accordance with the specialized components employed in inkjet printing systems (particularly thermal inkjet units) which typically include numerous small openings, passageways, and the like through which ink materials must pass, the inks selected for use in these systems must be carefully considered. Otherwise, print quality deterioration and a decrease in operating efficiency can occur. In addition to these factors, the ink materials of interest must comply with many other requirements including high levels of waterfastness, lightfastness, fluorescence intensity, bleed resistance, and the like. The present invention involves specialized invisible ink compositions which are particularly well-suited for use in inkjet printing systems (especially those which employ thermal inkjet technology). Likewise, the materials and methods described herein overcome numerous problems associated with prior invisible ink formulations and offer many advantages including but not limited to (1) high print quality levels (particularly when thermal inkjet technology is employed); (2) superior lightfastness and waterfastness; (3) excellent fluorescence intensity during illumination with an appropriate light source; and (4) a high level of reliability when used in connection with inkjet printing systems (particularly those which employ thermal inkjet technology).

Accordingly, the present invention represents an advance in the art of invisible ink imaging which satisfies a long-felt need as noted above. It will become readily apparent from the following discussion that the invention is novel in the materials and procedures that it employs, as well as the results which it obtains. The claimed invention therefore constitutes a unique development of considerable significance which will now be discussed in detail.

SUMMARY OF THE INVENTION

It is an object of the present invention to provide a novel invisible ink composition which contains a highly sensitive fluorophoric compound that cannot be seen by the unaided eye but fluoresces with considerable intensity when illuminated with far red ("FR") or infrared ("IR") light (characterized herein as a far red/infrared fluorophore or fluorophoric compound).

It is another object of the invention to provide a novel invisible ink composition which contains a highly sensitive far red/infrared fluorophoric compound that is uncomplexed with any polymeric additives or other ingredients.

It is another object of the invention to provide a novel invisible ink composition which, in an-alternative embodiment, likewise contains (in combination with the far red/infrared fluorophore) an ultraviolet fluorophoric compound which cannot be seen by the unaided eye but fluoresces with considerable intensity when illuminated with ultraviolet ("UV") light.

It is another object of the invention to provide a novel invisible ink composition which is highly suitable for use with inkjet printing systems (especially those that employ thermal inkjet technology).

It is another object of the invention to provide a novel invisible ink composition which is waterfast, lightfast, and capable of producing high resolution printed images.

It is another object of the invention to provide a novel invisible ink composition in which the fluorophoric materials therein have fluorescent properties that enable them to be readily observed using a minimal amount of detection equipment.

It is another object of the invention to provide a novel invisible ink composition which is capable of being used in a highly reliable manner with a wide variety of printing systems.

It is another object of the invention to provide a novel invisible ink composition which provides the foregoing benefits while using a minimal number of chemical ingredients.

It is a further object of the invention to provide a novel invisible ink composition which is able to form clear and distinct printed images on a wide variety of substrates, with "special" substrates not being required.

It is a further object of the invention to provide a novel invisible ink composition which is suitable for use in many different applications, environments, and situations.

It is a still further object of the invention to provide a novel printing method which employs the invisible ink materials described above.

It is a still further object of the invention to provide a novel printing method which employs the invisible ink materials described above wherein inkjet technology is used to generate printed images.

It is an even further object of the invention to provide a novel printing method which employs the invisible ink materials described above in a thermal inkjet printing apparatus.

It is an even further object of the invention to provide a novel printing method which employs the invisible ink materials described above that is rapid, accurate, and reliable with a high level of print quality.

A brief summary of the invention and its benefits will now be provided, with specific details thereof being recited in the Detailed Description of Preferred Embodiments section. The present invention involves a highly effective invisible ink composition and image generation method which can be used in many different environments. In particular, the various embodiments of the claimed ink composition are able to generate printed images on a selected substrate (including paper materials) which cannot be seen by the unaided eye when applied to a substrate and viewed with "natural" light (e.g. light from the sun) or light from conventional incandescent lamps and the like. Both of these light forms (as well as other forms which are normally used for general illumination purposes in homes, businesses, and the like) are collectively characterized as "white" light which involves a combination of all the various colored light fractions which fall within a wavelength range of about 300–700 nm. Under these illumination conditions, the ink compositions are essentially colorless. Only after illumination with other, more narrow light wavelengths do the printed images become visible to the observer (either with or without auxiliary observation equipment).

To observe the "invisible" printed images, they must be illuminated with either far red or infrared light (e.g. light within an optimal and non-limiting wavelength range of about 650–715 nm which encompasses both the far red and infrared wavelengths of primary interest) or ultraviolet ("UV") light (e.g. light within an optimal and non-limiting wavelength range of about 250–380 nm), depending on the particular embodiment under consideration. Regardless of the specific embodiment selected for use in a given situation, the ink compositions described herein (and printing methods associated therewith) enable printed images to be generated with a high level of image quality while avoiding the difficulties experienced by conventional invisible inks. Polymeric additives or "complexing agents" are not required in the ink formulations discussed below, with the claimed dye compounds being characterized as "uncomplexed". The term "uncomplexed" as used herein shall involve a situation in which the dyes of interest are not chemically linked to any particular materials (especially polymeric compounds) and do not form any dye "complexes". As a result, the overall ability of the inks to function effectively in many different printing systems with high reliability levels is increased. This is particularly true when thermal inkjet systems are employed to generate invisible images in a high-speed manner with minimal "down-time". Additional benefits and specific information regarding the ink formulations and printing methods of the invention will be presented in the Detailed Description of Preferred Embodiments section, with the claimed products and processes representing a considerable advance in the art of invisible imaging technology.

In a primary embodiment of the invention, an ink composition is provided which includes an invisible dye comprising an uncomplexed invisible metal phthalocyanine fluorophore of the far red/infrared variety which is optimally water-soluble. Materials that are "invisible" as discussed herein involve compositions which cannot be seen by the unaided eye under the conditions expressed above. The term "fluorophore" generally involves a chemical composition which is capable of absorbing light and thereafter emitting fluorescent light upon excitation with light of a given wavelength. Phthalocyanines (as a group) are basically defined to include four isoindole groups (e.g. $[(C_6H_4)C_2N]$) which are linked together to form a complex conjugated structure. Metal phthalocyanine materials contain one or more metal atoms therein which are strategically located in the phthalocyanine structure. The term "uncomplexed" is defined above and encompasses metal phthalocyanine compounds that are not chemically linked with any other materials (including organic polymers) to form complex molecules as used in prior systems such as those discussed in U.S. Pat. No. 5,614,008. Of primary interest in this case is the use of a novel uncomplexed invisible aluminum phthalocyanine fluorophore, with further information regarding this composition being provided below.

As previously noted, the use of dye-polymer complexes can present reliability and image-quality problems in systems which, for example, employ thermal inkjet technology on a high-speed/high resolution basis (e.g. at least about 600 dpi ["dots-per-inch"] at a frequency of about 12–16 kHz or more). The use of an invisible metal (e.g. aluminum) phthalocyanine fluorophoric dye composition that is uncomplexed and employed in a "free" state in connection with the wavelength ranges specified herein represents a novel advance in the art of invisible ink imaging, especially in connection with thermal inkjet technology.

While the present invention in its broadest sense shall not be restricted to any specific uncomplexed invisible metal phthalocyanine far red/infrared fluorophores, it has been discovered that unexpectedly superior results (in terms of image quality, waterfastness, lightfastness, reliability, fluorescence intensity, and the like) are achieved through the use of a special water-soluble uncomplexed aluminum phthalocyanine far red/infrared fluorophore. This particular material shall be designated herein as "chloroaluminum (III) phthalocyanine tetrasulfonic acid" (or salts thereof) which (in the acid form) involves the following structural formula:

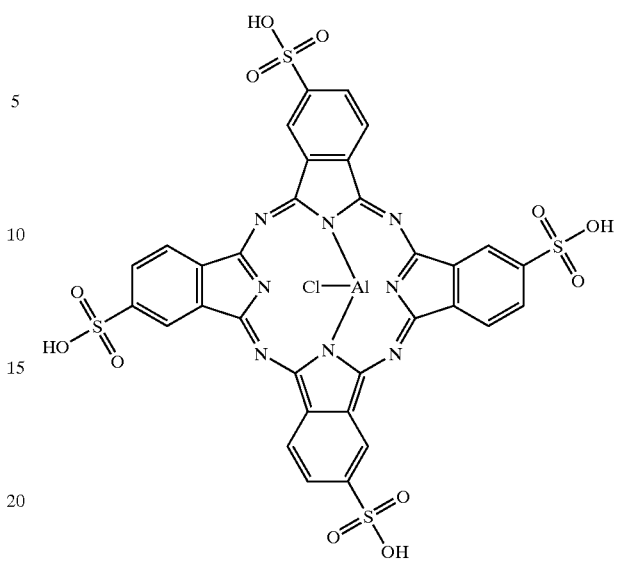

From a nomenclature standpoint, the above-listed composition consists of $C_{32}H_{16}AlClN_8O_{12}S_4$, with the following "long-hand" name being applicable: chloro[29H,31H-phthalocyanine-2,9,17,24-tetrasulphonato (6-) -N29,N30,N32]-aluminate(4-). As shown in the foregoing formula, four (—SO$_3$H) groups are provided. To form salts of this compound, the hydrogen ions in one or more of the (—SO$_3$H) groups (e.g. 1–4 of the groups) may be replaced with a positive counterion preferably selected from the group consisting of lithium (Li$^+$) sodium (Na$^+$), potassium (K$^+$), rubidium (Rb$^+$), calcium (Ca$^{+2}$), magnesium (Mg$^{+2}$), aluminum (Al$^{+3}$), ammonium (NH$_4^+$), and water-soluble ammonium compounds such as the methyl, ethyl, and ethoxy derivatives thereof. All of the selected counterions may be the same when more than one of the (—SO$_3$H) groups is involved or mixtures of different counterions can be employed. A representative and non-limiting example of a salt of the above-listed composition (e.g. sodium chloroaluminum [III] phthalocyanine tetrasulfonate) is provided as follows:

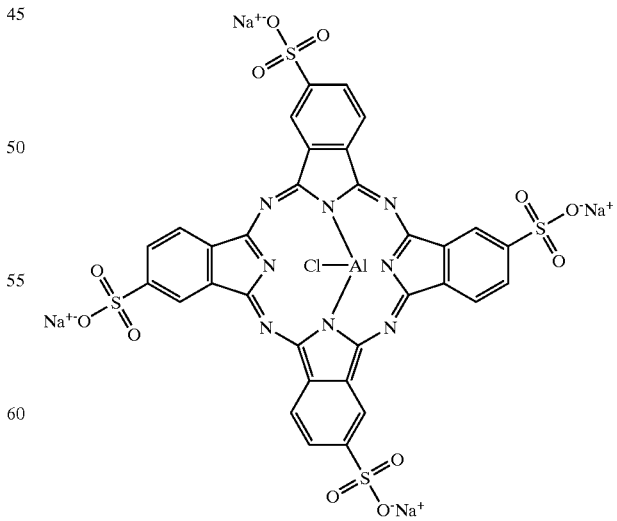

Again, many different salts are possible (along with varying "saturation" levels associated with the [SO$_3^{-1}$] groups shown above.) Chloroaluminum (III) phthalocyanine tetrasulfonic acid and salts thereof are commercially available from the Ciba-Geigy Corp. of Charlotte, N.C. (USA)/Basel Switzerland under the name "TINOLUX BBS" or "tetrabenzo tetraazaporphine". Likewise, in a preferred and non-limiting embodiment, the completed ink composition will contain about 1–200 ppm or about 0.0001–0.02% by weight of the invisible dye material (e.g. the uncompleted invisible metal far red/infrared phthalocyanine fluorophore with particular reference to chloroaluminum [III] phthalocyanine tetrasulfonic acid and salts thereof).

The uncompleted invisible metal phthalocyanine far red/infrared fluorophoric dye compositions discussed above (including chloroaluminum [III] phthalocyanine tetrasulfonic acid/salt materials) cannot be seen with the unaided eye (e.g. are "invisible") as defined above. However, in accordance with the fluorophoric character thereof, such materials will fluoresce with a high degree of intensity (discussed below) when illuminated with far red or infrared light having a wavelength sufficient to cause such fluorescence (light within an optimal, non-limiting wavelength range of about 650–715 nm which encompasses both the far red and infrared wavelengths of primary interest). This flourescent emission can then be detected and otherwise characterized (observed) using a suitable detection/observation system. Fluorescent emission associated with the foregoing far red/infrared fluorophores (e.g. the specific and general materials listed above) will optimally involve the generation of light within a wavelength range of about 670–720 nm). This light is not visible with the unaided eye and can be detected using suitable detection devices as specified below.

The claimed ink composition will likewise comprise at least one ink "vehicle" which may include a number of different ingredients in combination. In a preferred embodiment, the ink vehicle will comprise (1) water; (2) at least one organic solvent material (which may also function as a "humectant", namely, a moisture-retaining agent); or preferably mixtures thereof with these compositions being present in varied proportions as further discussed in the Detailed Description of Preferred Embodiments section. Exemplary and preferred organic solvents/vehicles suitable for use in the claimed ink composition include but are not limited to 2-pyrrolidone; ethoxylated glycerol; diethylene glycol; tetraethylene glycol; 1,5-pentanediol; 1,3-propanediol; N-methyl pyrrolidone; 2-propanol; 2-ethyl-2-hydroxymethyl-1,3-propanediol; and mixtures thereof. At this point, it should be emphasized that the present invention and its various embodiments shall not be restricted to any particular compositions, materials, proportions, amounts, and other parameters unless otherwise stated herein. All numerical values and ranges provided in this description are recited for example purposes only and shall constitute preferred embodiments of the invention designed to achieve maximum operational efficiency. As a final note regarding the ink compositions of interest, they may include a number of supplemental (e.g. optional) ingredients outlined in considerable detail below including without limitation surfactants, additional humectants (defined above), biocides, buffering agents, and the like. Specific and detailed examples of preferred ink formulations will again be presented in the following Detailed Description of Preferred Embodiments section.

In a second embodiment, an alternative ink composition is provided which includes all of the ingredients listed in connection with the first embodiment (including the uncomplexed invisible metal phthalocyanine far red/infrared fluorophore as a general class of materials and the preferred composition recited above [chloroaluminum (III) phthalocyanine tetrasulfonic acid or salts thereof]). Accordingly, the previous discussion involving the first ink composition shall be incorporated by reference relative to the second ink composition now being described. The main difference between both ink formulations involves the addition of a second invisible dye composition to the alternative ink product, with the second dye comprising at least one invisible ultraviolet fluorophore which cannot be seen by the unaided eye in "white" light or other comparable light forms as discussed above. However, when ultraviolet light is applied (e.g. light within an optimum, non-limiting wavelength range of about 250–380 nm), the ultraviolet fluorophore will fluoresce in a visible manner (e.g. within an optimum, non-limiting wavelength range of about 400–650 nm) and is thereby observable with the unaided eye. Incidentally, in this embodiment, the invisible ultraviolet fluorophore discussed above shall be designated herein as a "second invisible dye", with the uncompleted invisible metal phthalocyanine far red/infrared fluorophore being characterized as a "first invisible dye".

This embodiment shall not be restricted to any particular quantities in connection with both of the above-listed fluorophores (which may be determined in accordance with routine preliminary pilot testing). However, optimum results are achieved if the ink composition contains about 1–200 ppm or about 0.0001–0.02% by weight total combined first invisible dye (e.g. the uncompleted invisible metal phthalocyanine far red/infrared fluorophore as a general class of materials and the preferred composition recited above [chloroaluminum (III) phthalocyanine tetrasulfonic acid or salts thereof]) and about 500–50000 ppm or about 0.05–5% by weight total combined second invisible dye, namely, the claimed ultraviolet fluorophore[s]. While a number of different ultraviolet fluorophores may be used in connection with the second invisible dye without limitation, exemplary and preferred materials suitable for this purpose include but are not limited to ultraviolet absorbing stilbenes, pyrazolines, coumarins, carbostyrils, pyrenes, and mixtures thereof. Representative materials in each of these classes are as follows: (1) stilbenes: 4,4'-bis(triazin-2-ylamino)stilbene-2,2'-disulfonic acid; benzenesulfonic acid-2,2'-(1,2-ethenediyl)bis[5-[4-bis(2-hydroxyethyl)amino]-6-[(4-sulfophenyl)amino]-1,3,5-triazin-2yl]amino-tetrasodium salt; and 4,4-bis [4-diisopropanolamino-6-(p-sulfoanilino)-s-triazin-2-yl-amine]stilbene-sodium disulfonate; (2) pyrazolines: 1,2-diphenyl-2-pyrazoline; (3) coumarins: 7-diethylamino-4-methylcoumarin; 7-hydroxy-4-methylcoumarin; and 3-(2-benzimidazolyl)-7-(diethylamino)coumarin; (4) carbostyrils: 2-hydroxyquinoline; and (5) pyrenes: N-(1-pyrenebutanoyl) cysteic acid. Also of interest as an ultraviolet fluorophore is dibenzothiophene-5,5-dioxide, as well as C.I. (Color Index) Fluorescent Brightener 28; C.I. Fluorescent Brightener 220; and C.I. Fluorescent Brightener 264, with some or all of these C.I. compositions being comparable or structurally equivalent to the specific materials listed above. The foregoing ultraviolet fluorophores and others are commercially available from numerous sources including but not limited to the Aldrich Chemical Co. of Milwaukee, Wis. (USA); Bayer Corporation of Pittsburgh, Pa. (USA) under the names "BLANKOPHORE" or "PHORWHITE"; Ciba-Geigy Corporation of Greensboro, N.C. (USA)/Basil, Switzerland; Molecular Probes of Eugene, Oreg. (USA); Sandoz Chemicals of Charlotte, N.C. (USA) under the name "LEUKOPHOR"; and Sigma Co. of St. Louis, Mo. (USA). These materials are characterized by their ability to generate fluorescent light upon ultraviolet illumination as discussed herein which can be seen by the unaided eye.

This alternative embodiment of the claimed ink composition will likewise comprise a number of additional materials therein, all of which are substantially the same as those listed above in connection with the first embodiment. For example, at least one ink "vehicle" will be employed which may include a number of different ingredients in combination. In a preferred embodiment, the ink vehicle will again comprise (1) water; (2) at least one organic solvent material (which may also function as a "humectant", namely, a moisture-retaining agent); or preferably mixtures thereof, with these compositions being present in varied proportions. Exemplary and preferred organic solvents/vehicles suitable for use in the claimed second ink composition include but are not limited to 2-pyrrolidone; ethoxylated glycerol; diethylene glycol; tetraethylene glycol; 1,5-pentanediol; 1,3-propanediol; N-methyl pyrrolidone; 2-propanol; 2-ethyl-2-hydroxymethyl-1,3-propanediol; and mixtures thereof. As a final note regarding the ink formulations associated with this embodiment, they may again contain a number of supplemental (e.g. optional) ingredients outlined in considerable detail below including without limitation surfactants, additional humectants, biocides, buffering agents, and the like.

Having described the ink compositions of primary interest in this case and their main components, preferred printing methods using the specialized ink products of the invention will now be summarized. Basically, the inks may be delivered using a wide variety of printing systems without limitation. However, in a preferred embodiment, the claimed inks are particularly suitable for delivery using inkjet printing units (especially those which employ thermal inkjet technology). This suitability is based on the particular ingredients chosen for use in the ink compositions (especially the uncomplexed invisible metal phthalocyanine far red/infrared fluorophore, namely, chloroaluminum [III] phthalocyanine tetrasulfonic acid or salts thereof). The following discussion shall therefore focus on the use of inkjet technology to deliver the claimed ink compositions to a selected substrate with the understanding that the inks described herein may also be transferred using other diverse printing techniques ranging from silkscreen methods to conventional offset processes.

To produce a printed invisible image using the selected ink formulations, an ink delivery system is initially provided. In a preferred embodiment, the ink delivery system will generally be configured in the form of an ink cartridge unit (mounted within a suitable printer) which includes a housing having at least one ink-retaining chamber inside. The ink-retaining chamber will contain a supply of invisible ink therein corresponding to either of the two embodiments listed above. In this regard, the printing method currently being described is equally applicable to all of the ink compositions discussed herein. These compositions again include (1) the product of the first embodiment in which the ink composition contains [A] an invisible dye comprising an uncompleted invisible metal phthalocyanine far red/infrared fluorophore (with chloroaluminum [III] phthalocyanine tetrasulfonic acid or salts thereof providing optimum results); and [B] an ink vehicle comprising water and/or at least one organic solvent, and (2) the product of the second embodiment in which the ink composition contains [A] a first invisible dye comprising an uncomplexed invisible metal phthalocyanine far red/infrared fluorophore (with chloroaluminum [III] phthalocyanine tetrasulfonic acid or salts thereof again providing optimum results); [b] a second invisible dye comprising an ultraviolet fluorophore; and [c] an ink vehicle comprising water and/or at least one organic solvent. Specific information regarding these ink materials is listed above (including the optimal absorption/emission wavelength characteristics thereof), with this information being incorporated by reference in the present discussion of preferred printing methods. In particular, it is important to note that the selected uncomplexed invisible metal phthalocyanine far red/infrared fluorophore will optimally absorb light within a wavelength range of about 650–715 nm and emit fluorescent light within a wavelength range of about 670–720 nm. Likewise, in the second embodiment of the claimed ink composition, the ultraviolet fluorophore will optimally absorb light within a wavelength range of about 250–380 nm and emit light within a wavelength range of about 400–650 nm.

The ink delivery system also includes a printhead in fluid communication with the ink-retaining chamber and ink materials in the housing, with the printhead comprising at least one ink ejector for expelling ink on-demand from the ink-retaining chamber. In an exemplary and preferred embodiment involving the use of a thermal inkjet apparatus, the printhead will include a plurality of resistors and an outer plate having at least one or more ink ejection openings through the plate.

Next, a substrate is provided which is designed to receive the invisible ink. The present invention shall not be limited to any particular substrates, with a wide variety of materials being applicable for this purpose including substrates made from paper, metal, plastic, and the like. It is an important attribute of the claimed ink formulations and methods that "specials" substrates (including custom-produced paper products) are not required.

To initiate the printing process, the printhead of the ink delivery system is activated in order to deliver the chosen invisible ink composition from the ink retaining chamber of the housing onto the substrate. Activation of the printhead in a thermal inkjet system will involve selective energization of the resistors in order to heat the ink and thereby expel it from the ink retaining chamber. If non-thermal-inkjet systems are used to deliver the ink, printhead activation will be accomplished using the particular ink ejectors under consideration, with the procedures associated therewith varying from system to system. It should also be understood that the printing process discussed above is equally applicable to (A) systems in which the inkjet printhead is directly attached to the housing in order to form an integral, self-contained cartridge unit having a supply of ink within the housing; and (B) systems in which the housing and ink materials therein are remotely positioned from the printhead and in fluid communication therewith using one or more tubular conduits. In this regard, any statements which indicate that the printhead is in "fluid communication" with or "operatively connected to" the ink retaining chamber and housing shall encompass both of the foregoing variations.

In accordance with the steps described above, a printed image is generated on the substrate which is not visible to the unaided eye in "normal" or "white" light as discussed herein, with the image thus being characterized as "invisible". As a result, the printed image is highly useful in security-related applications. When detection of the image is desired (and the ink composition of the first embodiment is employed which contains a selected invisible far red/infrared fluorophore), light is applied having a wavelength sufficient to cause the printed image to emit fluorescent light. In order to achieve optimum results in this embodiment (which again involves the use of an invisible far red/infrared fluorophore including but not limited to chloroaluminum [III] phthalocyanine tetrasulfonic acid or salts thereof), either far red or infrared light is applied to the image. In a preferred embodiment, light within an optimal, non-limiting wavelength range of about 650–715 nm is used which encompasses both the far red and infrared wavelengths of primary interest. Within this range, best results may be achieved using a non-limiting wavelength range of about 660–690 nm. The application of light in this manner will cause the ink composition to fluoresce within an optimal, non-limiting wavelength range of about 670–720 (best= about 670–710 nm). A high fluorescence level is achieved using the uncomplexed invisible metal phthalocyanine far red/infrared fluorophore compositions described herein (particularly chloroaluminum [III] phthalocyanine tetrasulfonic acid/salt materials which provide unexpectedly superior results). The resulting fluorescent emission from the printed image (which is not visible to the unaided eye) may then be detected or otherwise observed using a suitable infrared fluorescence detecting system to be discussed in greater detail below.

In an alternative embodiment, the invisible printed image can be produced from an ink composition which has (A) the first invisible dye (e.g. the uncomplexed invisible metal phthalocyanine far red/infrared fluorophore with particular emphasis on chloroaluminum [III] phthalocyanine tetrasulfonic acid and salts thereof); and (B) the second invisible dye, namely, an invisible ultraviolet fluorophore. As previously noted, the image generated from this dual-fluorophore ink composition will likewise be invisible to the unaided eye when viewed under "normal" or "white" light as previously indicated. When observation/detection of the image is desired, light of a predetermined wavelength is applied to the invisible printed image which again has a wavelength sufficient to cause the printed image to generate fluorescent light. The light which may be employed for this purpose includes: (1) either far red or infrared light which, in a preferred embodiment, will involve an optimal, non-limiting wavelength range of about 650–715 nm which encompasses both the far red and infrared wavelengths of primary interest, with best results being achieved at about 66014 690 nm; and/or (2) ultraviolet light within a preferred and non-limiting wavelength range of about 250–380 nm. The application of light in this manner will cause the ink composition to fluoresce in a highly effective manner. Specifically, if far red or infrared light is applied (e.g. within the foregoing range), fluorescent light will be emitted within an optimal, non-limiting wavelength range of about 670–720 nm (best= about 670–710 nm). This emitted light (which is not visible to the unaided eye) may then be detected or otherwise observed using a suitable infrared fluorescence detecting system to be discussed in greater detail below.

If ultraviolet light is applied (e.g. within the foregoing range), fluorescent light will be emitted within an optimal, non-limiting wavelength range of about 400–650 nm. As a result, the printed image may be seen with the unaided eye and special observation or detecting equipment is not required. Likewise, the unique nature of this "combined" FR/IR/UV fluorophore system will become readily apparent from the specific information provided below.

In a system where far red/infrared light and ultraviolet light are applied in combination to a printed image containing both of the fluorophores listed above, the results will involve a combination of the effects described above. Specifically, a "dual emission" situation will exist involving fluorescent light from both fluorophores which can be observed using either of the previously described techniques. The selection of any given technique (either an appropriate detecting system or the unaided eye) will depend on whether the emission being observed is from the far red/infrared fluorophore or the ultraviolet fluorophore.

A decision to employ an ink composition containing an uncomplexed invisible metal phthalocyanine far red/infrared fluorophore (particularly chloroaluminum [III] phthalocyanine tetrasulfonic acid or salts thereof) by itself or combined with an ultraviolet fluorophore will depend on the intended use of the marking system. For example, the combined FR/IR/UV fluorophore technique provides the following benefits: (1) a high degree of flexibility which enables users of the system to employ either a far red/infrared or ultraviolet light source with a single ink composition; and (2) an enhanced level of security by requiring readability in two different wavelength regions. Regardless of which ink formulation is selected for use, the present invention represents a considerable advance in the art of invisible ink imaging. In particular, the claimed inks and printing methods provide many important benefits compared with previously known techniques including a high degree of simplicity, applicability to a wide variety of printing systems with emphasis on thermal inkjet technology, cost-efficiency, superior print quality/uniformity, excellent stability (namely, lightfastness and waterfastness), and the general ability to produce completely invisible images which are readily detected on-demand by the application of far red, infrared, and/or ultraviolet light thereto.

The summary presented above was designed to offer a brief overview of the invention and shall not limit the scope thereof in any manner. A more detailed, fully-enabling, and comprehensive assessment of the invention including a discussion of the claimed inks and printing techniques will now be provided. Accordingly, these and other objects, features, and advantages of the invention shall be set forth below in the Detailed Description of Preferred Embodiments.

DETAILED DESCRIPTION OF PREFERRED EMBODIMENTS

A novel marking system for producing invisible printed images on a wide variety of substrates will now be described in detail. The ink compositions of interest employ special combinations of ingredients which clearly depart from previously-known materials. These ingredients are particularly appropriate for use in inkjet printing systems, especially those which employ thermal inkjet technology. The unique character of the claimed ink formulations, the specialized processes used to generate invisible images, and the distinctive manner in which the images are viewed will become readily apparent from the following discussion.

To provide a clear and complete understanding of the invention, the following description will be divided into three sections, namely, (1) "A. An Overview of Thermal Inkjet Technology"; (2) "B. The Ink Compositions"; and (3) "C. Printing and Detecting Methods."

A. An Overview of Thermal Inkjet Technology

The novel ink compositions and printing methods described herein are again applicable to a wide variety of printing devices (also characterized as "ink delivery systems") which include (1) a housing having an internal compartment or chamber therein; (2) a printhead directly or remotely connected to the housing and in fluid communication with the chamber; and (3) at least one "ink ejector" associated with the printhead. As previously noted, the term "ink ejector" is defined to encompass any component, system, or device which selectively ejects or expels ink on-demand from the printhead. Thermal inkjet cartridges which use multiple heating resistors as ink ejectors are preferred for this purpose. However, the claimed invention shall not be restricted to any particular ink ejectors or inkjet printing technologies as indicated above. Instead, a wide variety of different ink delivery devices are applicable including but not limited to piezoelectric drop systems of the general type disclosed in U.S. Pat. No. 4,329,698 to Smith, dot matrix systems of the variety described in U.S. Pat. No. 4,749,291 to Kobayashi et al., as well as other comparable and functionally equivalent systems designed to deliver ink using one or more ink ejectors. The specific operating components associated with these alternative systems (e.g. the piezoelectric elements in the apparatus of U.S. Pat. No. 4,329,698) shall be encompassed within the term "ink ejectors" as previously noted.

Figure 1:
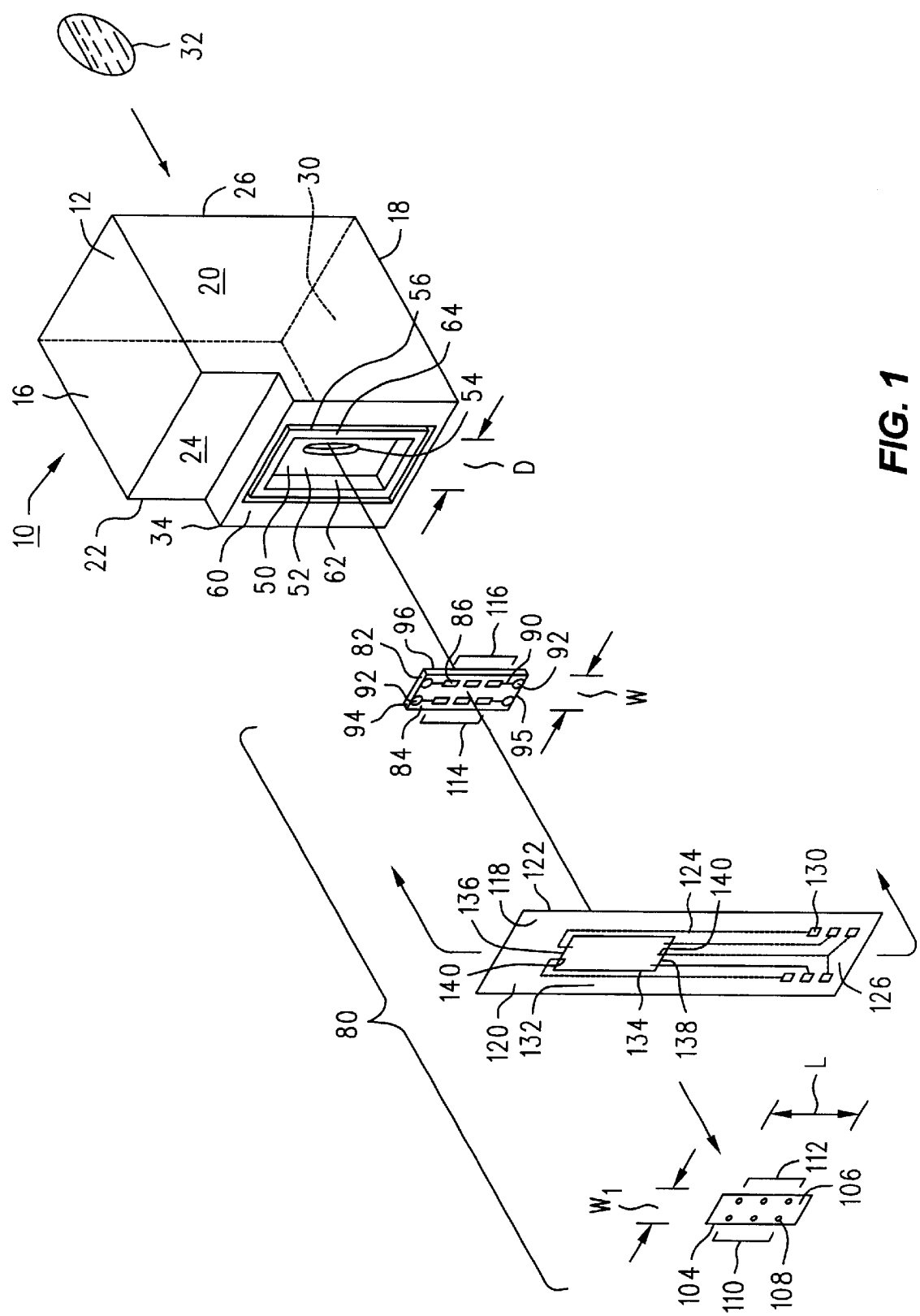
FIG. 1 is an exploded perspective schematic view of a representative thermal inkjet cartridge unit which may be used with the novel ink compositions and printing methods of the present invention.

To facilitate a complete understanding of the claimed invention as it applies to thermal inkjet technology (which is the preferred system of primary interest and novelty), an overview of this technique will now be provided. A representative thermal inkjet cartridge unit is illustrated in FIG. 1 at reference number 10. It shall be understood that cartridge 10 is presented herein for example purposes and is non-limiting. In addition, cartridge 10 is shown in schematic format in FIG. 1, with more detailed information regarding cartridge 10 and its various features being provided in U.S. Pat. No. 4,500,895 to Buck et al.; U.S. Pat. No. 4,771,295 to Baker et al.; U.S. Pat. No. 5,278,584 to Keefe et al.; and the *Hewlett-Packard Journal*, Vol. 39, No. 4 (August 1988), all of which are incorporated herein by reference.

With continued reference to FIG. 1, the cartridge 10 first includes a housing 12 which is preferably manufactured from plastic, metal, or a combination of both. The housing 12 further comprises a top wall 16, a bottom wall 18, a first side wall 20, and a second side wall 22. In the embodiment of FIG. 1, the top wall 16 and the bottom wall 18 are substantially parallel to each other. Likewise, the first side wall 20 and the second side wall 22 are also substantially parallel to each other.

The housing 12 further includes a front wall 24 and a rear all 26. Surrounded by the front wall 24, rear wall 26, top all 16, bottom wall 18, first side wall 20, and second side all 22 is an interior ink-retaining compartment or chamber 30 within the housing 12 (shown in phantom lines in FIG. 1) which is designed to retain a supply of an ink composition 32 therein (either in liquid [uncontained] form, retained within an absorbent foam-type member [not shown], or stored in a bladder-like structure [not shown]). The ink composition 32 will involve the novel ink formulations of the present invention as discussed in detail below.

The front wall 24 further includes an externally-positioned, outwardly-extending printhead support structure 34 which comprises a substantially rectangular central cavity 50 therein. The central cavity 50 has a bottom wall 52 shown in FIG. 1 with an ink outlet port 54 therein. The ink outlet port 54 passes entirely through the housing 12 and, as a result, communicates with the chamber 30 inside the housing 12 so that ink materials can flow outwardly from the chamber 30 through the ink outlet port 54.

Also positioned within the central cavity 50 is a rectangular, upwardly-extending mounting frame 56, the function of which will be discussed below. As schematically shown in FIG. 1, the mounting frame 56 is substantially even (flush) with the front face 60 of the printhead support structure 34. The mounting frame 56 specifically includes dual, elongate side walls 62, 64.

With continued reference to FIG. 1, fixedly secured to housing 12 of the ink cartridge 10 (e.g. attached to the outwardly-extending printhead support structure 34) is a printhead generally designated in FIG. 1 at reference number 80. For the purposes of this invention and in accordance with conventional terminology, the printhead 80 actually comprises two main components fixedly secured together (with certain sub-components positioned therebetween). The first main component used to produce the printhead 80 consists of a substrate 82 preferably manufactured from silicon. Secured to the upper surface 84 of the substrate 82 using conventional thin film fabrication techniques is a plurality of individually-energizable thin-film resistors 86 which function as "ink ejectors" and are preferably fabricated from a tantalum-aluminum composition known in the art for resistor construction. Only a small number of resistors 86 are shown in the schematic representation of FIG. 1, with the resistors 86 being presented in enlarged format for the sake of clarity. Also provided on the upper surface 84 of the substrate 82 using conventional photolithographic techniques is a plurality of metallic conductive traces 90 (e.g. circuit elements) which electrically communicate with the resistors 86. The conductive traces 90 also communicate with multiple metallic pad-like contact regions 92 positioned at the ends 94, 95 of the substrate 82 on the upper surface 84. The function of all these components which, in combination, are collectively designated herein as a resistor assembly 96 will be discussed further below.

Many different materials and design configurations may be used to construct the resistor assembly 96, with the present invention not being restricted to any particular elements, materials, and components for this purpose. However, in a preferred, representative, and non-limiting embodiment, the resistor assembly 96 will be approximately 0.5 inches long, and will likewise contain 300 resistors 86 thus enabling a resolution of approximately 600 dots per inch ("DPI") . The substrate 82 containing the resistors 86 thereon will preferably have a width "W" (FIG. 1) which is less than the distance "D" between the side walls 62, 64 of the mounting frame 56. As a result, ink flow passageways are formed on both sides of the substrate 82 so that ink flowing from the ink outlet port 54 in the central cavity 50 can ultimately come in contact with the resistors 86 as discussed further below. It should also be noted that the substrate 82 may include a number of other components thereon (not shown) depending on the type of ink cartridge 10 under consideration.

Securely affixed to the upper surface 84 of the substrate 82 (with a number of intervening material layers therebetween including a barrier layer [not shown]) is the second main component of the printhead 80. Specifically, an orifice plate 104 is provided as illustrated in FIG. 1 which is used to distribute the selected ink compositions to a designated print media material or substrate (e.g. paper). In accordance with the claimed invention, the orifice plate 104 consists of a panel member 106 (shown schematically in FIG. 1) which is manufactured from one or more metal compositions (e.g. gold-plated nickel or other comparable materials). The orifice plate 104/panel member 106 in a representative and non-limiting embodiment has an overall thickness of about 10–70 microns and is sized to fit over and conform with the substrate 82. However, the present invention shall not be restricted to any particular dimensions in connection with the orifice plate 104, with the invention being prospectively applicable to many different orifice plate units of variable size and shape.

The orifice plate 104 further comprises at least one and preferably a plurality of openings or "orifices" therethrough which are designated at reference number 108. These orifices 108 are shown in enlarged format in FIG. 1. Each orifice 108 in a representative embodiment will have a diameter of about 0.01–0.05 mm. In the completed printhead 80, all of the components listed above are assembled so that each of the orifices 108 is aligned with at least one of the resistors 86 (e.g. "ink ejectors") on the substrate 82. As result, energization of a given resistor 86 will cause ink expulsion from the desired orifice 108 through the orifice plate 104. The claimed invention shall not be limited to any particular size, shape, or dimensional characteristics in connection with the orifice plate 104 and shall likewise not be restricted to any number or arrangement of orifices 108. In a representative embodiment as presented in FIG. 1, the orifices 108 are arranged in two rows 110, 112 on the panel member 106 associated with the orifice plate 104. If this arrangement of orifices 108 is employed, the resistors 86 on the resistor assembly 96 (e.g. the substrate 82) will also be arranged in two corresponding rows 114, 116 so that the rows 114, 116 of resistors 86 are in substantial registry with the rows 110, 112 of orifices 108. Further information concerning this type of metallic orifice plate system is provided in, for example, U.S. Pat. No. 4,500,895 to Buck et al. which is incorporated herein by reference. It should also be noted that, while the system illustrated in FIG. 1 involves the use of orifice plates produced from metal compositions, alternative printing systems have effectively employed orifice plate structures constructed from non-metallic organic polymer compositions. Further data regarding the use of non-metallic organic orifice plate systems is provided in U.S. Pat. No. 5,278,584 (incorporated by reference).

With continued reference to FIG. 1, a film-type flexible circuit member 118 is likewise provided in connection with the cartridge 10 which is designed to "wrap around" the outwardly-extending printhead support structure 34 in the completed ink cartridge 10. Many different materials may be used to produce the circuit member 118, with representative (non-limiting) examples including polytetrafluoroethylene (e.g. Teflon@), polyimide, polymethylmethacrylate, polycarbonate, polyester, polyamide polyethyleneterephthalate, or mixtures thereof. Likewise, a representative commercial organic polymer (e.g. polyimide-based) composition which is suitable for constructing the flexible circuit member 118 is a product sold under the trademark "KAPTON" by the DuPont Corporation of Wilmington, Del. (USA). The flexible circuit member 118 is secured to the printhead support structure 34 by adhesive affixation using conventional adhesive materials (e.g. epoxy resin compositions known in the art for this purpose). The flexible circuit member 118 enables electrical signals to be delivered and transmitted from the printer unit (not shown) to the resistors 86 (or other ink ejectors) on the substrate 82 as discussed below. The film-type flexible circuit member 118 further includes a top surface 120 and a bottom surface 122 (FIG. 1). Formed on the bottom surface 122 of the circuit member 118 and shown in dashed lines in FIG. 1 is a plurality of metallic (e.g. gold-plated copper) circuit traces 124 which are applied to the bottom surface 122 using known metal deposition and photolithographic techniques. Many different circuit trace patterns may be employed on the bottom surface 122 of the flexible circuit member 118, with the specific pattern depending on the particular type of ink cartridge 10 and printing system under consideration. Also provided at position 126 on the top surface 120 of the circuit member 118 is a plurality of metallic (e.g. gold-plated copper) contact pads 130. The contact pads 130 communicate with the underlying circuit traces 124 on the bottom surface 122 of the circuit member 118 via openings or "vias" (not shown) through the circuit member 118. During use of the ink cartridge 10 in a printer unit, the pads 130 come in contact with corresponding printer electrodes in order to transmit electrical control signals from the printer unit to the contact pads 130 and traces 124 on the circuit member 118 for ultimate delivery to the resistor assembly 96. Electrical communication between the resistor assembly 96 and the flexible circuit member 118 will again be outlined below.

Positioned within the middle region 132 of the film-type flexible circuit member 118 is a window 134 which is sized to receive the orifice plate 104 therein. As shown schematically in FIG. 1, the window 134 includes an upper longitudinal edge 136 and a lower longitudinal edge 138. Partially positioned within the window 134 at the upper and lower longitudinal edges 136, 138 are beam-type leads 140 which, in a representative embodiment, are gold-plated copper and constitute the terminal ends (e.g. the ends opposite the contact pads 130 ) of the circuit traces 124 positioned on the bottom surface 122 of the flexible circuit member 118. The leads 140 are designed for electrical connection by soldering, thermocompression bonding, and the like to the contact regions 92 on the upper surface 84 of the substrate 82 associated with the resistor assembly 96. As a result, electrical communication is established from the contact pads 130 to the resistor assembly 96 via the circuit traces 124 on the flexible circuit member 118. Electrical signals from the printer unit (not shown) can then travel via the conductive traces 90 on the substrate 82 to the resistors 86 so that on-demand heating (energization) of the resistors 86 can occur.

It is important to emphasize that the present invention shall not be restricted to the specific printhead 80 illustrated in FIG. 1 and discussed above, with many other printhead designs also being suitable for use in accordance with the claimed invention. Likewise, it should also be noted that if a non-metallic organic polymer-type orifice plate system is desired, the orifice plate 104 and flexible circuit member 118 can be manufactured as a single unit as discussed in U.S. Pat. No. 5,278,584.

The final step in producing the completed printhead 80 involves attachment of the orifice plate 104 in position on the underlying portions of the printhead 80 so that the orifices 108 are in precise alignment with the resistors 86 on the substrate 82. Representative thermal inkjet cartridge units which incorporate all or part of the components listed above are commercially available from the Hewlett-Packard Company of Palo Alto, Calif. (USA) under the following product designations/numbers: 51641A, 51645A, 51640C, 51640A, and 51649A which are provided as non-limiting examples. These ink cartridges and ink cartridge 10 discussed above in connection with FIG. 1 involve a "self-contained" ink delivery system which includes an "on-board" supply of ink. The claimed invention may likewise be used with other systems (both thermal inkjet and non-thermal-inkjet) which employ a printhead and a supply of ink stored within an ink containment vessel that is remotely spaced from but operatively connected to and in fluid communication with the printhead (also known as an "off-axis" system). Fluid communication is accomplished using one or more tubular conduits. An example of such a system is disclosed in co-owned Pending U.S. patent application Ser. No. 08/869,446 filed on Jun. 5, 1997 which is incorporated herein by reference. In this regard, the terms "operatively connected" and "in fluid communication" as used to define the interrelationship between the printhead and the ink containment vessel shall be broadly construed to encompass (A) a system in which the ink containment vessel is directly attached to and in fluid communication with the printhead to form, for example, a single cartridge unit having an "on-board" ink supply; and (B) an "off-axis" system as previously discussed in which the ink containment vessel is remotely spaced from the printhead and not "directly" attached thereto. Having described an example of a thermal inkjet cartridge 10 suitable for use in connection with the present invention, the claimed novel ink compositions and image generation methods will now be discussed.

B. The Ink Compositions

As outlined in this section, novel colorless ink compositions are disclosed which are capable of producing images that are "invisible". Invisible ink materials are traditionally defined to involve a broad class of ink formulations which cannot be seen by the unaided eye when applied to a substrate and viewed with "natural" light (e.g. light from the sun) or light from conventional incandescent lamps and the like. Both of these light forms (as well as other forms which are normally used for general illumination purposes in homes, businesses, and the like) are collectively characterized as "white" light which involves a combination of all the various colored light fractions which fall within a wavelength range of about 300–700 nm. Under these illumination conditions, the ink compositions described below are essentially colorless. Only after illumination with other, more narrow light wavelengths do the printed images become visible or otherwise detectible (either with or without auxiliary observation equipment). The specialized ink compositions outlined in this section are characterized by the use of novel ingredients which collectively provide improved image stability, high print quality levels, the production of images which are detected/viewed using illumination systems of minimal complexity, and suitability for delivery to many different substrates by high-speed inkjet printers which preferably employ thermal inkjet technology. The two primary embodiments of the claimed ink composition will now be discussed in detail.

1. Ink Composition No. 1

This ink formulation comprises a number of ingredients which cooperate to produce the beneficial results discussed above. Specifically, an ink composition is provided which includes an invisible dye comprising at least one or more uncomplexed invisible metal phthalocyanine far red/infrared fluorophores which are optimally water-soluble. The term "invisible" as used herein is discussed above and again involves materials that cannot be seen by the unaided eye. The word "fluorophore" generally involves a chemical composition which is capable of absorbing light and thereafter emitting fluorescent light upon excitation with light of a given wavelength. The composition listed above is characterized as a far red ("FR")/infrared ("IR") fluorophore because it is able to emit fluorescent light (discussed below) when illuminated by light in the far red or infrared spectral regions. Far red light normally involves a wavelength range of about 650–700 nm, with infrared light involving a range which exceeds about 700 nm up to about 1000 nm. In accordance with the present invention, the materials described herein are primarily designed to fluoresce when illuminated with light in an optimal, non-limiting wavelength range of about 650–715 nm (which encompasses the far red and infrared wavelengths of primary interest). This step results in fluorescent light emission within an optimal, non-limiting wavelength range of about 670–720 nm as described later in this section.

Phthalocyanines (as a group) are basically defined to include four isoindole groups (e.g. $[(C_6H_4)C_2N]$) which are linked together to form a complex conjugated structure. Metal phthalocyanine materials contain one or more metal atoms therein which are strategically located in the phthalocyanine structure. In accordance with a preferred embodiment of the invention, aluminum phthalocyanine materials provide excellent results. The term "uncomplexed" as previously defined encompasses metal (e.g. aluminum) phthalocyanine compounds that are not chemically linked with any other materials (including organic polymers) to form complex molecules as used in prior systems such as those discussed in U.S. Pat. No. 5,614,008. The use of invisible dye-polymer complexes can present reliability and image-quality problems in systems which, for example, employ thermal inkjet technology on a high-speed/high resolution basis (e.g. at least about 600 dpi ["dots-per-inch" ] at a frequency of about 12–16 kHz or more). The use of an invisible metal (e.g. aluminum) phthalocyanine fluorophoric dye product that is uncomplexed and employed in a "free" state represents a novel advance in the art of invisible ink imaging, especially in connection with thermal inkjet technology.

While the present invention in its broadest sense shall not be restricted to any specific uncomplexed invisible metal phthalocyanine far red/infrared fluorophores, it has been discovered that unexpectedly superior results (in terms of image quality, waterfastness, lightfastness, reliability, fluorescence intensity, and the like) are achieved through the use of a special water-soluble uncomplexed invisible aluminum phthalocyanine far red/infrared fluorophore. This particular material shall be designated herein as "chloroaluminum (III) phthalocyanine tetrasulfonic acid" (and salts thereof) which (in the acid form) involves the following structural formula:

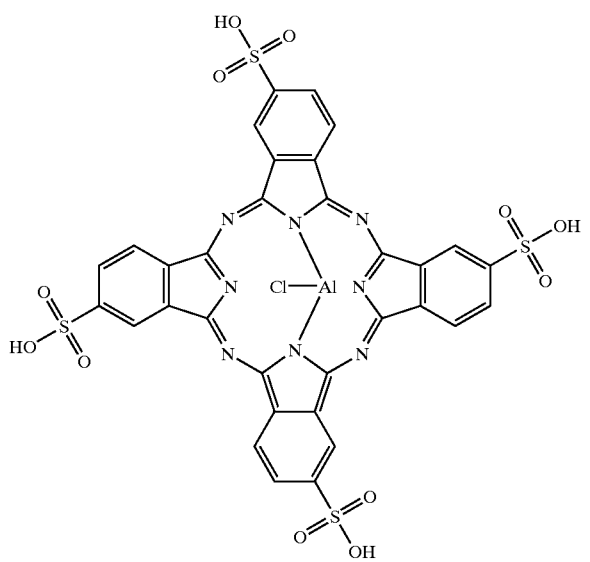

From a nomenclature standpoint, the above-listed composition consists of $C_{32}H_{16}AlClN_8O_{12}S_4$, with the following "long-hand" name being applicable: chloro[29H,31H-phthalocyanine-2,9,17,24-tetrasulphonato(6-) -N29,N30,N32]-aluminate(4-). This material has an approximate molecular weight of about 895.22. As shown in the foregoing formula, four (—$SO_3H$) groups are provided. To form salts of this compound, the hydrogen ions in one or more of the (—$SO_3H$) groups (e.g. 1–4 of the groups) may be replaced with a positive counterion preferably selected from the group consisting of lithium ($Li^+$) sodium ($Na^+$), potassium ($K^+$), rubidium ($Rb^+$), calcium ($Ca^{+2}$), magnesium ($Mg^{+2}$), aluminum ($A^{+3}$), ammonium ($NH_4^+$), and water-soluble ammonium compounds such as the methyl, ethyl, and ethoxy derivatives thereof. All of the selected counterions may be the same when more than one of the (—$SO_3H$) groups is involved or mixtures of different counterions can be employed. A representative and non-limiting example of a salt of the above-listed composition (sodium chloroaluminum [III] phthalocyanine tetrasulfonate) is provided as follows:

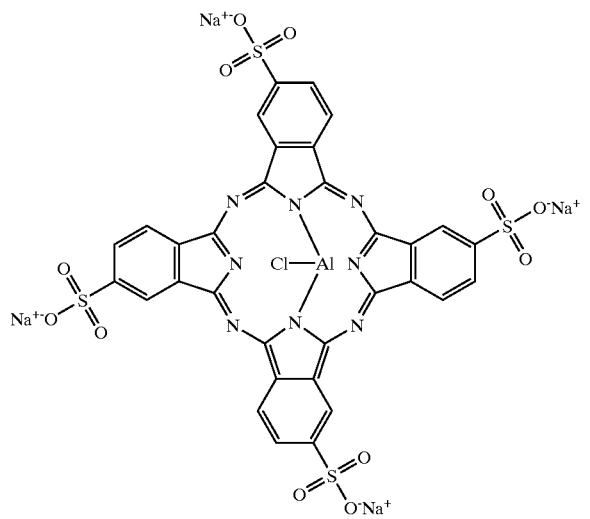

Again, many different salts are possible (along with varying "saturation" levels associated with the [$SO_3^-$] groups shown above.) Chloroaluminum (III) phthalocyanine tetrasulfonic acid and salts thereof are commercially available from the Ciba-Geigy Corp. of Greensboro, N.C. (USA)/Basel Switzerland under the name "TINOLUX BBS" or "tetrabenzo tetraazaporphine". Likewise, in a preferred and non-limiting embodiment, the completed ink composition will contain about 1–200 ppm or about 0.0001–0.02% by weight of the invisible dye material (e.g. the uncompleted invisible metal phthalocyanine far red/infrared fluorophore with particular reference to chloroaluminum [III] phthalocyanine tetrasulfonic acid and salts thereof). This range is applicable if a single far red/infrared fluorophore is employed or if multiple far red/infrared fluorophores are used in combination (with the foregoing range involving the total amount of combined far red/infrared fluorophores in the ink).

The uncompleted invisible metal phthalocyanine far red/infrared fluorophoric dye compositions discussed above (including chloroaluminum [III] phthalocyanine tetrasulfonic acid/salt materials) cannot be seen with the unaided eye (e.g. are "invisible") as previously noted. However, in accordance with the fluorophoric character thereof, such materials will fluoresce with a high degree of intensity (described below) when illuminated with far red or infrared light (optimally light within a preferred wavelength range of about 650–715 nm). This flourescent emission can then be detected and otherwise characterized (observed) using a suitable detection/observation system as outlined in the next section. Fluorescent emission associated with the foregoing infrared fluorophores (e.g. the specific and general materials listed herein) will involve the generation of light within the far red or infrared wavelength regions (optimally within a non-limiting wavelength range of about 670–720 nm [particularly when chloroaluminum [III] phthalocyanine tetrasulfonic acid or salts thereof is employed]). This light is not visible with the unaided eye and can be analyzed using suitable detection devices as indicated below.

The next ingredient of interest to be employed within the ink composition associated with this embodiment involves an ink "vehicle" which is primarily used as a carrier medium for the other components in the completed ink product. In a preferred embodiment, the ink vehicle will consist of: (1) water; (2) at least one organic ink solvent material; or preferably (3) mixtures thereof, with these compositions being present in varied proportions as needed in accordance with preliminary pilot testing. The term "solvent" as used herein shall be broadly construed to involve a material that is employed to carry the desired fluorophore[s] therein in a homogeneous and uniform manner. Likewise, the solvent will also inherently function as a "humectant", namely, a moisture-retaining agent, with the term "solvent" being construed to encompass materials added for solvent purposes, humectant purposes, or (most often) both purposes. Exemplary and preferred organic ink solvents suitable for use in the claimed ink composition include but are not limited to 2-pyrrolidone; ethoxylated glycerol; diethylene glycol; tetraethylene glycol; 1,5-pentanediol; 1,3-propanediol; N-methyl pyrrolidone; 2-propanol; 2-ethyl-2-hydroxymethyl-1,3-propanediol; and mixtures thereof. At this point, it should be emphasized that this ink composition and its various alternative embodiments shall not be restricted to any particular ingredients, materials, proportions, amounts, and other parameters unless otherwise stated herein. Any numerical values presented in this section are provided for example purposes only and shall constitute preferred embodiments of the invention designed to achieve maximum operational efficiency. All of the above materials may be used in various combinations as determined by preliminary pilot studies on the ink formulations of concern.

The ink composition associated with this embodiment will basically consist of the selected fluorophore[s] as discussed above and the ink vehicle. Thus, after addition of the fluorophore[s] in the preferred quantity values listed herein (e.g. about 0.0001–0.02% by weight or other values as determined by preliminary testing), the amount of ink vehicle to be combined therewith will be the quantity needed to reach 100% by weight. In other words, the ink vehicle will constitute the balance of the ink composition under consideration above and beyond the amount of fluorophores in use. However, in a preferred embodiment, it is preferred that the ink composition associated with this embodiment employ an ink vehicle which is at least about 30% by weight water. An exemplary ink vehicle will contain about 60–87% by weight water and about 10–37% by weight of one or more organic solvents, with the balance involving at least one of the other materials listed below.

Next, the ink composition may include a number of optional ingredients as part of the total ink "vehicle" in varying amounts. For example, an optional biocide may be added to prevent any microbial growth in the final ink product. Exemplary biocides suitable for this purpose include proprietary products sold under the trademarks PROXEL GXL by Imperial Chemical Industries of Manchester, England; UCARCID 250 by Union Carbide of Danbury, Conn. (USA); and NUOSEPT 95 by Huls America, Inc. of Piscataway, N.J. (USA). If a biocide is used, the final ink composition will optimally contain about 0.05–0.5% by weight biocide, with about 0.30% by weight being preferred.

Also employed as part of the ink "vehicle" are one or more optional surfactant materials which are designed to provide beneficial surface tension and homogeneity characteristics in the completed ink formulation. While the present invention shall not be restricted to any particular surfactant compositions in general (most of which are proprietary in nature), exemplary and preferred materials suitable for this purpose include but are not limited to a surfactant product sold under the name "Tergitol 15-S-5" by the Union Carbide Co. of Danbury, Conn. (USA) which basically involves a $C_{11-15}$ pareth-5 material having the following formula: $R_1R_2CH(C_2H_4O)_5OH$ [wherein $R_1$ and $R_2=C_{11-15}$] and a composition sold under the name "Crodafos N-3 Acid" by Croda, Inc. of Parsippany, N.J. (USA) which comprises a material consisting of oleth-3 phosphate or polyoxyethylene (3) oleyl ether phosphate (acid). Other surfactant materials suitable for use in the ink composition of interest include a compound sold under the name "Mackam OCT-50" by McIntyre Chemical, Inc. of University Park, Ill. (USA) which basically consists of an octyl betaine composition (e.g. $C_8H_{17}N\oplus CH_3CH_3CH_2COO\ominus$) and a commercial surfactant sold by the Dow Chemical Company of Midland, Mich. (USA) under the name "Dowfax 8390" which comprises a diphenyl sulfonate (sodium n-hexadecyl diphenyloxide disulfonate) compound. Again, any of these compounds alone or in combination will be suitable for use in the ink composition of interest. While the inks described herein shall not be restricted to any particular quantity values in connection with the optional surfactant materials (which may again be determined in accordance with routine preliminary pilot testing), it is preferred that the final ink composition contain about 0.1–3% by weight total (combined) surfactant therein (if used).

The resulting ink product may be then be used directly in the printing methods of the present invention as discussed further below. Upon completion, the ink composition in this embodiment will typically have an average viscosity of about 1.0–5.0 centipoise, with a surface tension of about 30–45 dynes/cm although these values are subject to variation in accordance with the specific materials that are selected to produce the final ink formulation. As previously noted, the claimed ink compositions shall not be restricted to any particular materials or material quantities unless otherwise specified herein. However, the following Example involves a representative and preferred formulation designed to provide excellent results and unexpectedly superior image generation using thermal inkjet printing technology:

EXAMPLE 1

| Ingredient | Amount (% by weight) |
| --- | --- |
| Invisible dye composition (Uncomplexed aluminum phthalocyanine far red/infrared fluorophore, namely, chloroaluminum [III] phthalocyanine tetrasulfonic acid as illustrated above) | 0.007% (e.g. 70 ppm) |
| 1,5-pentanediol (solvent) | 8% |
| 2-ethyl-2-hydroxymethyl-1,3-propanediol (solvent) | 7.5% |
| 1,3-propanediol (solvent) | 7.5% |
| Surfactant No. 1 ("TERGITOL 15-S-5" as previously defined) | 1.5% |
| Surfactant No. 2 ("Dowfax 8390" as previously defined) | 1.5% |
| Water | Balance 100% |

Again, this Example is provided for illustration purposes only and represents a non-limiting preferred embodiment. In particular, the use of chloroaluminum [III] phthalocyanine tetrasulfonic acid/salts enables unexpectedly superior results to be achieved and was selected as an optimum material over a number of other compositions for this reason. Specifically, this dye has excellent water solubility characteristics, high fluorescence, and good lightfastness. Additionally, it avoids the generation of weak or misdirected ink droplets in thermal inkjet systems and likewise avoids the formation of undesired residues therein which can lead to cloggage and related problems. This formulation and the other ink compositions described herein are invisible to the unaided eye (e.g. colorless) until they are illuminated with light at an appropriate wavelength as reviewed in the next section.

2. Ink Composition No. 2

This ink composition also comprises a number of ingredients which again cooperate to produce the beneficial results discussed herein. The ink formulation in this embodiment involves all of the ingredients, proportions, physical characteristics, and other parameters mentioned above in connection with Ink Composition No. 1 unless otherwise noted. In this regard, the foregoing discussion concerning Ink Composition No. 1 shall be incorporated by reference in this description of Ink Composition No. 2. Nonetheless, in order to provide a full, complete, and enabling disclosure of Ink Composition No. 2 and its functional attributes, a detailed overview of this material will now be presented. It is important to note that the key distinguishing characteristic of Ink Composition No. 2 over Ink Composition No. 1 involves the use of a plurality of invisible dye materials in Ink Composition No. 2.

The main functional ingredients in Ink Composition No. 2 are multiple invisible dyes, namely, dyes which cannot be seen by the unaided eye under "normal" or "white" light as discussed above, but nonetheless fluoresce when illuminated with light of a specific wavelength. Ink Composition No. 2 specifically includes a first invisible dye composition comprising an uncomplexed invisible metal phthalocyanine far red/infrared fluorophore as previously defined. Again, "complexed" dye compositions can present reliability and image-quality problems in systems which, for example, employ thermal inkjet technology on a high-speed/high resolution basis (e.g. at least about 600 dpi ["dots-per-inch"] at a frequency of about 12–16 kHz or more). The use of an invisible metal (e.g. aluminum) phthalocyanine fluorophoric dye product that is uncomplexed and employed in a "free" state represents a novel advance in the art of invisible ink imaging, especially in connection with thermal inkjet technology.

While the present invention in its broadest sense shall not be restricted to any specific uncomplexed invisible metal phthalocyanine far red/infrared fluorophores, it has been discovered that unexpectedly superior results (in terms of image quality, waterfastness, lightfastness, reliability, fluorescence intensity, and the like) are again achieved in this embodiment through the use of a special water-soluble uncomplexed invisible metal (e.g. aluminum) phthalocyanine far red/infrared fluorophore. This particular material shall be designated herein as "chloroaluminum (III) phthalocyanine tetrasulfonic acid" (and salts thereof) which (in the acid form) involves the same structural formula listed above in connection with Ink Composition No. 1.

From a nomenclature standpoint, the foregoing composition again consists of $C_{32}H_{16}AlClN_8O_{12}S_4$, with the following "long-hand" name being applicable: chloro [29H,31H-phthalocyanine-2,9,17,24-tetrasulphonato(6-)-N29,N30,N32]-aluminate(4-). In accordance with this formula, four ($-SO_3H$) groups are provided. To form salts of this compound, the hydrogen ions in one or more of the ($-SO_3H$) groups (e.g. 1–4 of the groups) may be replaced with a positive counterion preferably selected from the group consisting of lithium ($Li^+$) sodium ($Na^+$), potassium ($K^+$), rubidium ($Rb^+$), calcium ($Ca^{+2}$), magnesium ($Mg^{+2}$), aluminum ($Al^{+3}$), ammonium ($NH_4^+$), and water-soluble ammonium compounds such as the methyl, ethyl, and ethoxy derivatives thereof. All of the selected counterions may be the same when more than one of the ($-SO_3H$) groups is involved or mixtures of different counterions can be employed. A representative and non-limiting example of a salt of the above-listed composition (namely, sodium chloroaluminum [III] phthalocyanine tetrasulfonate) was illustrated above in connection with Ink Composition No. 1 and is equally applicable to Ink Composition No. 2.

Again, many different salts are possible (along with varying "saturation" levels associated with the [$SO_3^1$] groups as shown above). Chloroaluminum (III) phthalocyanine tetrasulfonic acid and salts thereof are commercially available from the Ciba-Geigy Corp. of Greensboro, N.C. (USA)/Basel Switzerland under the name "TINOLUX BBS" or "tetrabenzo tetraazaporphine" as previously noted. Likewise, in a preferred and non-limiting embodiment, the completed Ink Composition No. 2 will contain about 1–200 ppm or about 0.0001–0.02% by weight of the first invisible dye material (e.g. the uncomplexed invisible metal [e.g. aluminum] phthalocyanine far red/infrared fluorophore[s] with particular reference to chloroaluminum [III] phthalocyanine tetrasulfonic acid and salts thereof). This range is applicable if a single far red/infrared fluorophore is employed or if multiple far red/infrared fluorophores are used in combination (with the foregoing range involving the total amount of combined far red/infrared fluorophores in the ink).

The uncomplexed invisible metal phthalocyanine far red/infrared fluorophoric dye compositions discussed above (including chloroaluminum [III] phthalocyanine tetrasulfonic acid/salt materials) cannot be seen with the unaided eye (e.g. are "invisible") as previously noted. However, in accordance with the fluorophoric character thereof, such materials will fluoresce with a high degree of intensity (described below) when illuminated with far red or infrared light (optimally light within a preferred wavelength range of about 650–715 nm which encompasses the far red and infrared wavelengths of primary interest). This flourescent emission can then be detected and otherwise characterized (observed) using a suitable detection/observation system as outlined in the next section. Fluorescent emission associated with the foregoing far red/infrared fluorophores (e.g. the specific and general materials listed herein) will involve the generation of light within the far red or infrared wavelength regions (optimally within a non-limiting exemplary wavelength range of about 670–720 nm). This specific range is particularly applicable when chloroaluminum [III] phthalocyanine tetrasulfonic acid or salts thereof is employed. The resulting flourescent light is not visible with the unaided eye and can be analyzed using suitable detection devices as indicated below.

Ink Composition No. 2 also contains a second invisible dye in order to form a unique FR/IR/UV combination product. The second invisible dye comprises at least one invisible ultraviolet fluorophore. This material involves a composition which is invisible to the unaided eye as defined above, but will fluoresce when illuminated with ultraviolet light. Ultraviolet light traditionally involves a wavelength range of about 250–400 nm, with the light to be applied in this embodiment optimally being within a non-limiting wavelength range of about 250–380 nm. The resulting flourescent light generated by the ultraviolet fluorophore in the present embodiment will have an optimal, non-limiting wavelength range of about 400–650 nm which is visible to the unaided eye. Many different materials may be employed as the invisible ultraviolet fluorophore without limitation provided that they retain the functional characteristics listed above. However, exemplary and preferred ultraviolet fluorophores suitable for this purpose include but are not limited to ultraviolet absorbing materials in the following classes: stilbenes, pyrazolines, coumarins, carbostyrils, pyrenes, and mixtures thereof. Representative materials in each of these classes are as follows: (1) stilbenes: 4,4'-bis(triazin-2-ylamino)stilbene-2,2'-disulfonic acid; benzenesulfonic acid-2,2'-(1,2-ethenediyl)bis[5-[4-bis(2-hydroxyethyl)amino]-6-[(4-sulfophenyl)amino]-1,3,5-triazin-2yl]amino-tetrasodium salt; and 4,4'-bis[4-diisopropanolamino-6-(p-sulfoanilino)-s-triazin-2-yl-amine]stilbene-sodium disulfonate; (2) pyrazolines: 1,2-diphenyl-2-pyrazoline; (3) coumarins: 7-diethylamino-4-methylcoumarin; 7-hydroxy-4-methylcoumarin; and 3-(2-benzimidazolyl)-7-(diethylamino)coumarin; (4) carbostyrils: 2-hydroxyquinoline; and (5) pyrenes: N-(1-pyrenebutanoyl) cysteic acid. Also of interest as an ultraviolet fluorophore is dibenzothiophene-5,5-dioxide, as well as C.I. (Color Index) Fluorescent Brightener 28; C.I. Fluorescent Brightener 220; and C.I. Fluorescent Brightener 264, with some or all of these C.I. compositions being comparable or structurally equivalent to the specific materials listed above. The foregoing ultraviolet fluorophores and others are commercially available from numerous sources including but not limited to the Aldrich Chemical Co. of Milwaukee, Wis. (USA); Bayer Corporation of Pittsburgh, Pa. (USA) under the names "BLANKOPHORE" or "PHORWHITE"; Ciba-Geigy Corporation of Greensboro, N.C. (USA)/Basil, Switzerland; Molecular Probes of Eugene, Oreg. (USA); Sandoz Chemicals of Charlotte, N.C. (USA) under the name "LEUKOPHOR"; and Sigma Co. of St. Louis, Mo. (USA). The list provided above shall be considered representative only and non-limiting. As previously mentioned, the selected ultraviolet fluorophore is invisible when viewed by the unaided eye in "normal" or "white" light, but will fluoresce when illuminated with ultraviolet light (ideally within the foregoing wavelength range.) Likewise, the fluorescent emission provided by the ultraviolet fluorophore[s] in a preferred embodiment (including the ultraviolet fluorophores recited above) will be readily viewable with the unaided eye. As noted above, they will optimally emit light within a non-limiting wavelength range of about 400–650 nm which will enable them to be viewed without the need for special monitoring and detecting equipment.

The use of a "dual" fluorophoric invisible ink composition which contains both ultraviolet and far red/infrared fluorophores in combination offers many benefits. For example, it provides a multi-functional invisible imaging system with varying security levels. The primary attributes of such a system involve (1) substantially increased flexibility in enabling the use of either a far red/infrared or ultraviolet reader unit with a single ink composition; and (2) an enhanced level of security by requiring readability in two different wavelength regions. Accordingly, Ink Composition No. 2 represents a considerable advance in the art of invisible ink technology, with particular reference to the "dual" fluorophoric nature of the ink.

While Ink Composition No. 2 shall not be restricted to any particular numerical parameters in connection with the ingredients used therein, the completed ink formulation will preferably contain about 500–50000 ppm or about 0.05–5% by weight of the second invisible dye material (ultraviolet fluorophore). This range is applicable if a single ultraviolet fluorophore is employed or if multiple ultraviolet fluorophores are used in combination (with the foregoing range involving the total amount of combined ultraviolet fluorophores in the ink).

The remaining ingredients employed in Ink Composition No. 2 are substantially the same as those listed above in connection with Ink Composition No. 1. However, to again facilitate a full and complete disclosure of the claimed technology, a detailed summary of these ingredients will now be provided. The next ingredient of interest to be employed within Ink Composition No. 2 involves an ink "vehicle" which is primarily used as a carrier medium for the other components in the completed ink product. In a preferred embodiment, the ink vehicle will contain (1) water; (2) at least one organic ink solvent material; or preferably (3) mixtures thereof, with these compositions being present in varied proportions as needed in accordance with preliminary pilot testing. The term "solvent" as used herein shall be construed to broadly involve a material that is employed to carry the desired fluorophore[s] therein in a homogeneous and uniform manner. Likewise, the solvent will also inherently function as a "humectant", namely, a moisture-retaining agent, with the term "solvent" being construed to encompass materials added for solvent purposes, humectant purposes, or most often both of these purposes. Exemplary and preferred organic ink solvents suitable for use in Ink Composition No. 2 include but are not limited to 2-pyrrolidone; ethoxylated glycerol; diethylene glycol; tetraethylene glycol; 1,5-pentanediol; 1,3-propanediol; N-methyl pyrrolidone; 2-propanol; 2-ethyl-2-hydroxymethyl-1,3-propanediol; and mixtures thereof. At this point, it should be emphasized that this ink composition and its various alternative embodiments shall not be restricted to any particular ingredients, materials, proportions, amounts, and other parameters unless otherwise stated herein. Any numerical values presented in this section are provided for example purposes only and shall constitute preferred embodiments of the invention designed to achieve maximum operational efficiency. All of the above materials may be used in various combinations as determined by preliminary pilot studies on the ink formulations of concern. The ink composition associated with this embodiment will basically consist of the selected fluorophore[s] as discussed above and the ink vehicle. Thus, after addition of both fluorophore[s] in the preferred quantity values listed herein (e.g. about 0.0001–0.02% by weight for the far red/infrared fluorophore[s], about 0.05–5% by weight for the ultraviolet fluorophore[s], or other values as determined by preliminary testing), the amount of ink vehicle to be combined therewith will be the quantity needed to reach 100% by weight. In other words, the ink vehicle will constitute the balance of Ink Composition No. 2 above and beyond the amount of fluorophores in use. However, in a preferred embodiment, it is preferred that the ink composition associated with this embodiment employ an ink vehicle which is at least about 30% by weight water. An exemplary ink vehicle will contain about 60–87% by weight water and about 10–37% by weight of one or more organic solvents, with the balance involving at least one of the other materials listed below.

Ink Composition No. 2 may also include a number of optional ingredients as part of the total ink "vehicle" in varying amounts. For example, an optional biocide may be added to prevent any microbial growth in the final ink product. Exemplary biocides suitable for this purpose again include proprietary products sold under the trademarks PROXEL GXL by Imperial Chemical Industries of Manchester, England; UCARCID 250 by Union Carbide of Danbury, Conn. (USA); and NUOSEPT 95 by Huls America, Inc. of Piscataway, N.J. (USA). If a biocide is used, the final ink composition will optimally contain about 0.05–0.5% by weight biocide, with about 0.30% by weight being preferred.

Also employed as part of the ink "vehicle" are one or more optional surfactant materials which are designed to provide beneficial surface tension and homogeneity characteristics in the completed ink product. While the present invention shall not be restricted to any particular surfactants in general (most of which are proprietary in nature), exemplary and preferred materials suitable for this purpose include but are not limited to a surfactant product sold under the name "Tergitol 15-S-5" by the Union Carbide Co. of Danbury, Conn. (USA) which basically involves a $C_{11-15}$ pareth-5 material having the following formula: $R_1R_2CH(C_2H_4O)_5OH$ [wherein $R_1$ and $R_2=C_{1-15}$] and a composition sold under the name "Crodafos N-3 Acid" by Croda, Inc. of Parsippany, N.J. (USA) which comprises a material consisting of oleth-3 phosphate or polyoxyethylene(3) oleyl ether phosphate (acid). Other surfactant materials suitable for use in Ink Composition No. 2 include a product sold under the name "Mackam OCT-50" by McIntyre Chemical, Inc. of University Park, Ill. (USA) which basically consists of an octyl betaine composition (e.g. $C_8H_{17}N\oplus(CH_3CH_3CH_2COO\ominus)$) and a commercial surfactant sold by the Dow Chemical Company of Midland, Mich. (USA) under the name "Dowfax 8390" which comprises a diphenyl sulfonate (sodium n-hexadecyl diphenyloxide disulfonate) compound. Again, any of these compounds alone or in combination will be suitable for use in Ink Composition No.

2. While the inks described herein shall not be restricted to any particular quantity values in connection with the optional surfactants (which may again be determined in accordance with routine preliminary testing), Ink Composition No. 2 will preferably contain about 0.1–3% by weight total (combined) surfactant therein.

The resulting ink product may be then be used directly in the methods of the present invention as discussed further below. Upon completion, the ink composition in this embodiment will typically have an average viscosity of about 1.0–5.0 centipoise, with a surface tension of about 30–45 dynes/cm although these values are subject to variation in accordance with the specific materials that are selected to produce the final ink formulation. As previously noted, the ink compositions of interest as described herein shall not be restricted to any particular materials or material quantities unless otherwise specified. However, the following Example involves a representative and preferred Ink Composition No. 2 which is designed to provide excellent results and unexpectedly superior image generation using thermal inkjet printing technology:

EXAMPLE 2

| Ingredient | Amount (% by weight) |
| --- | --- |
| Invisible dye composition (Uncomplexed aluminum phthalocyanine far red/infrared fluorophore, namely, chloroaluminum [III] phthalocyanine tetrasulfonic acid as illustrated above) | 0.007% (e.g. 70 ppm) |
| Second invisible dye composition (an ultraviolet fluorophore, namely, benzenesulfonic acid-2,2'-(1,2-ethenediyl)bis[5-[4-bis(2-hydroxyethyl)-amino]-6-[(4-sulfophenyl)amino]-1,3,5-triazin-2yl]amino-tetrasodium salt sold under the name "BLANKOPHOR P" by Bayer Corp. of Pittsburgh, PA [USA]). | 3% |
| 1,5-pentanediol (solvent) | 8% |
| 2-ethyl-2-hydroxymethyl-1,3-propanediol (solvent) | 7.5% |
| 1,3-propanediol (solvent) | 7.5% |
| Surfactant No. 1 ("TERGITOL 15-S-5" as previously defined) | 1.5% |
| Surfactant No. 2 ("Dowfax 8390" as previously defined) | 1.5% |
| Water | Balance 100% |

Again, this Example is provided for illustration purposes only and represents a non-limiting preferred embodiment. In particular, the use of chloroaluminum [III] phthalocyanine tetrasulfonic acid/salts as previously discussed enables unexpectedly superior results to be achieved and was selected as an optimum material over a number of other compositions for this reason. A specific discussion of the benefits provided by the use of this product is presented above in connection with Ink Composition No. 1 and is incorporated herein by reference.

Having set forth the preferred and novel ink formulations of interest, the unique imaging methods associated therewith will now be discussed. Again, the claimed methods and materials have widespread applicability to many different printing technologies although, as previously stated, they are particularly useful in systems which employ thermal inkjet technology. Thus, the following section shall emphasize the use of thermal inkjet printing techniques with the understanding that the inventive concepts presented herein shall not be restricted to this particular method.

C. Printing and Detecting Methods

1. The Generation of Invisible Printed Images Using Ink Composition No. 1

Figure 2:
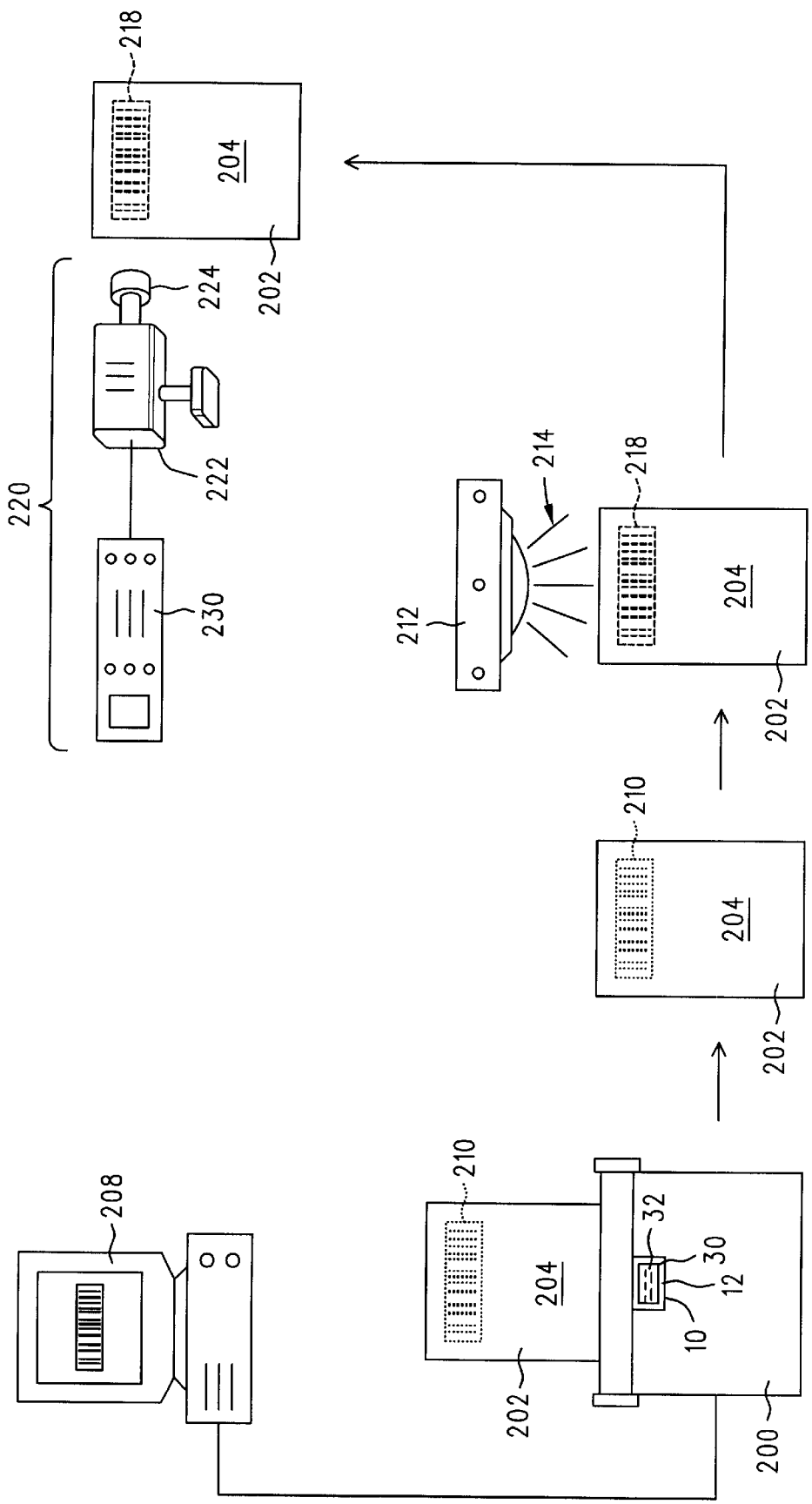
FIG. 2 is a schematic, sequential representation of the process steps which are employed to produce an invisible printed image on a substrate using the materials and methods of the invention in a primary embodiment, followed by the procedures that are used to observe or otherwise detect the image.

With reference to FIG. 2, a representative method is schematically illustrated for generating an invisible printed image on a substrate which can thereafter be detected on-demand. While the following discussion shall again involve an inkjet printing system (which employs thermal inkjet technology), many other printing methods may be used to deliver the claimed ink compositions including those ranging from conventional silk screening operations to standard offset printing techniques.

As schematically shown in FIG. 2, an inkjet printing unit 200 is provided which is employed as the printing apparatus in this embodiment. Many different systems may be selected for use as the printing unit 200, including printers manufactured and sold by the Hewlett-Packard Company of Palo Alto, Calif. (USA) under the following product designations: DESKJET 400C, 500C, 540C, 660C, 693C, 820C, 850C, 870C, 1200C, and 1600C. In addition, the inkjet printing unit 200 may consist of a specialized system described in co-owned and co-pending U.S. patent application Ser. No. 09/181,589 filed concurrently herewith on Oct. 28, 1998. A thermal inkjet cartridge unit (e.g. cartridge 10 illustrated in FIG. 1 and discussed above) is provided within the printing unit 200 which is supplied with a selected ink composition 32. The thermal inkjet cartridge 10 employed in this embodiment shall be characterized herein as an "ink delivery system" in view of its ability to selectively deliver the ink composition 32 to a chosen substrate on-demand. The ink composition 32 shown in FIG. 2 consists of invisible Ink Composition No. 1 as previously described which contains at least one uncomplexed invisible metal phthalocyanine far red/infrared fluorophore (particularly chloroaluminum [III] phthalocyanine tetrasulfonic acid and salts thereof). Again, many different inkjet and non-inkjet cartridge types (e.g. "ink delivery systems") may be employed in the processes described herein, with these systems including a housing, a printhead in fluid communication with the housing (which contains an ink storage/retaining chamber therein), and at least one ink ejector in the printhead. Regarding specific thermal inkjet cartridges which can be used as the cartridge unit 10, the invention shall not be limited in this regard. For example, numerous commercially-available cartridge units which are suitable for this purpose include those produced by the Hewlett-Packard Company of Palo Alto, Calif. (USA) under the following product designations: 51641A, 51645A, 51640C, 51640A, 51629A, and 51649A. All of the methods discussed herein shall likewise be equally applicable to ink delivery systems which employ (1) a printhead directly attached to the ink-containing housing; and (2) a printhead connected via one or more tubular conduits to a remotely-positioned housing having an ink supply therein as previously noted. The latter system is known as an "off-axis" unit as discussed in, for example, co-owned Pending U.S. patent application Ser. No. 08/869,446 filed on Jun. 5, 1997 which is incorporated herein by reference. The invention shall therefore not be restricted to any particular ink delivery systems, with many different variants being applicable.

Figure 3:
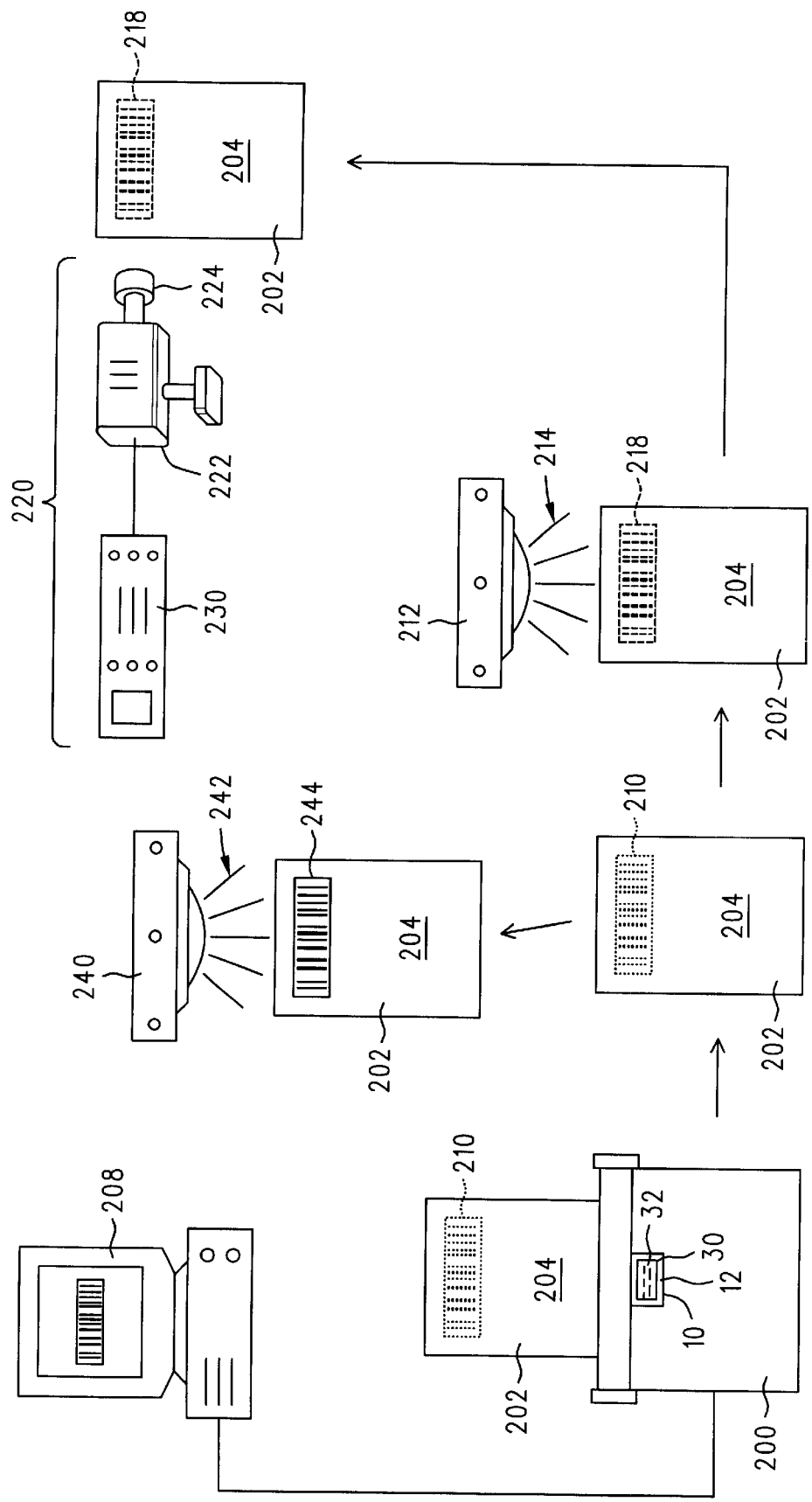
FIG. 3 is a schematic, sequential representation of the process steps which are employed to produce an invisible printed image on a substrate using the materials and methods of the invention in a secondary embodiment, followed by the procedures that are used to observe or otherwise detect the image.

With continued reference to FIG. 2, a substrate 202 is provided and inserted (e.g. placed) into the printing unit 200. The top surface 204 of the substrate 202 faces upwardly toward the ink cartridge 10. Many different materials may be used to produce the substrate 202 including, without limitation, paper (coated or uncoated), metal, plastic film materials (made of, for example, polyester resins, polycarbonate products, polyethylene compounds, and others), glass, and the like. In this regard, the claimed ink compositions and printing methods shall be not restricted to any given substrate materials which may be employed in sheet, strip, roll, or other forms without limitation. However, the processes shown in FIGS. 2–3 are particularly useful in connection with paper-based financial documents including but not limited to checks, statements, insurance papers, routing materials, and the like.

As schematically illustrated in the embodiment of FIG. 2, the printing unit 200 is electrically connected to an image generating apparatus 208 which may involve many different systems. Representative systems are selected from the group consisting of a personal computer (e.g. of the type manufactured by the Hewlett-Packard Company of Palo Alto, Calif. [USA] under the trademark "PAVILION®"), a scanner unit (e.g. of the variety sold by the Hewlett-Packard Company of Palo Alto, Calif. [USA] under the trademark "SCANJE®"), both of these devices, or any other suitable image producing system (including a bar-code generator) which will vary depending on the intended use of the ink compositions. The claimed processes shall likewise not be restricted to any particular image generation device, protocol, or format.

Next, the image generating apparatus 208 and the printing unit 200 are cooperatively activated in order to deliver the desired invisible printed image 210 (shown in phantom lines in FIG. 2) onto the top surface 204 of the substrate 202. The printed image 210 can involve a bar-code as illustrated in FIG. 2 or any other desired indicia. Both the image generating apparatus 208 and the printing unit 200 are used to selectively control the ink cartridge 10. The printing process is initiated by activation of the ink ejectors (e.g. thin-film resistors 86) in the printhead 80 of the ink cartridge 10 (See FIG. 1). The term "activation" in the system of FIG. 2 shall again involve a procedure in which the thin-film resistors 86 of the ink cartridge 10 are directed by the printing unit 200 to deliver the ink composition 32 from the compartment/chamber 30 of the housing 12 onto the top surface 204 of the substrate 202. This is accomplished by energizing the thin film resistors 86 in the printhead 80 of the cartridge 10. As a result, ink residing beneath the orifice plate 104 is thermally excited and expelled outwardly through the ink ejection orifices 108 in the plate 104 and onto the image-receiving substrate 202. In this manner, the cartridge 10 may be used to deliver the invisible printed image 210 to the substrate 202 using ink composition 32. The invisible printed image 210 is characterized as being "invisible" because it cannot be viewed by the unaided eye in "normal", "ambient", or "white" light as discussed above. Likewise, in accordance with the unique and specialized chemical components within the ink composition 32 (namely, Ink Composition No. 1), the invisible printed image 210 is stable (e.g. waterfast/lightfast) with a high resolution capacity. Again, the materials and processes discussed herein are appropriate for at least 600 dpi printing at a frequency of about 12–16 kHz or more.

At this point, the substrate 202 containing the invisible printed image 210 is preferably removed from the printing unit 200. When desired, the printed image 210 can be detected and otherwise characterized. To achieve this goal, the invisible printed image 210 produced from the ink composition 32 is illuminated by applying light at a wavelength sufficient to cause the printed image 210 to generate fluorescent light. This is accomplished in the present embodiment by delivering far red or infrared light onto the image 210. Far red light normally involves a wavelength range of about 650–700 nm, with infrared light involving a range which exceeds about 700 nm up to about 1000 nm. However, in a preferred and non-limiting embodiment designed to produce optimum results, the applied light is preferably within a wavelength range of about 650–715 nm (with a range of about 660–690 nm being best). Although the invisible printed image 210 has some absorption in the far red portion of the visible spectrum as noted above, the image 210 is again not detectible by the unaided eye because of the low dye concentrations being used and the low sensitivity of the human eye to wavelength values in this region.

As a result of this step, the ink composition 32 and invisible printed image 210 produced therefrom will emit far red or infrared fluorescent light. This light will optimally be within a non-limiting wavelength range of about 670–720 (preferred=about 670–710 nm) when the chemical materials discussed herein are used (including but not limited to chloroaluminum [III] phthalocyanine tetrasulfonic acid or salts thereof.) A far red/infrared illumination system 212 is schematically illustrated in FIG. 2 which may be used to deliver far red or infrared light 214 within the foregoing wavelength parameters to the substrate 202 and invisible printed image 210. Many different light sources may be employed in connection with the illumination system 212 (including standard red LED ["light-emitting diode" ] light delivery systems, halogen bulb illuminators, metal halide bulb units, and other comparable systems known in the art for infrared imaging). While this embodiment shall not be restricted to any particular systems for this purpose, exemplary commercial illuminators which may be employed as the illumination system 212 include products sold by Micro Laser Systems, Inc. of Garden Grove, Calif. (USA)—model L4 780s-24; Illumination Technologies, Inc. of Syracuse, N.Y. (USA)—model 3900; and Nikon of Japan under the designation "Metal Halide Fiber Optic Illuminator".

When the illumination system 212 is used to deliver light 214 to the invisible printed image 210, it will fluoresce to produce a fluorescent printed image designated at reference number 218 in FIG. 2. However, the fluorescent printed image 218 will not fluoresce in a manner which is visible to the unaided eye. Instead, it will fluoresce by generating far red or infrared light within an optimal, non-limiting wavelength range of about 670–720 nm (best=about 670–710 nm) in accordance with the specific materials used to produce the ink composition 32 including the metal phthalocyanine far red/infrared fluorophore, with particular reference to chloroaluminum (III) phthalocyanine tetrasulfonic acid and salts thereof. To detect or otherwise characterize the fluorescent printed image 218 on the top surface 204 of the substrate 202, an appropriate detecting system 220 is provided. The detecting system 220 may involve many different devices and components without limitation. For example, the system 220 schematically shown in FIG. 2 consists of a standard CCD ("charge coupled device") camera 222 which is fitted with an appropriate infrared filter 224 of known construction (e.g. a conventional 700 nm long pass filter in a representative, non-limiting example). Other camera systems are also suitable for use herein, with the foregoing arrangement of components being provided for example purposes only. With continued reference to FIG. 2, representative commercially-available detection devices which may be used in connection with the camera 222 include but are not limited to camera systems sold by the Pulnix Co. of Sunnyvale, Calif. (USA)—model 440 and Global Supply Co. of Toronto, Canada—model UNI-IR5.

The specific embodiment of FIG. 2 is particularly designed to read and otherwise detect bar-code images. Once the camera 222 is activated, the resulting electronic images are directed into an image processor 230 schematically illustrated in FIG. 2. The image processor 230 can involve many different systems without limitation including those which are designed to detect, interpret, and characterize bar code information. An exemplary commercial apparatus which is suitable for this purpose includes a system produced by Accusort, Inc. of Telford, Pa. (USA)—model 24. Likewise, many different devices may be used in connection with the image processor 230 ranging from bar code readers as previously discussed to video monitors which are designed to produce visually-observable images from signals generated by the camera 222. The present invention shall therefore not be restricted to any particular systems, sub-systems, or components associated with the image processor 230 which will vary depending on the intended use of the ink formulations. Regardless of which components are employed within the detecting system 220, it will enable the fluorescent printed image 218 to be detected on-demand in a highly effective manner, thus completing the image generating and monitoring process.

The production of invisible printed images in accordance with this embodiment (which employs Ink Composition No. 1) enables clear and stable printed images to be generated. Of particular value is the ability to accomplish these goals using many different printing systems including high-speed thermal inkjet units. The resulting images are again characterized by high resolution and throughput, excellent stability (including waterfastness and lightfastness), and the ability to fluoresce with a considerable degree of intensity. As a final note regarding the system of FIG. 2, the configuration of components shown therein is schematic only and may be varied as needed. A specific example of an integrated system which may be used in connection with the embodiment of FIG. 2 is again disclosed in co-owned, co-pending U.S. patent application Ser. No. 09/181,589 (filed concurrently on Oct. 28, 1998) which is incorporated herein by reference.

2. The Generation of Invisible Printed Images Using Ink Composition No. 2

With reference to FIG. 3, another method is schematically illustrated for generating an invisible printed image on a substrate which can thereafter be detected, viewed, or otherwise characterized on-demand. This method uses Ink Composition No. 2 discussed above which employs a dual fluorophore system, namely, (1) an ultraviolet fluorophore; and (2) a far red/infrared fluorophore in combination. Again, while the following discussion shall primarily involve an inkjet printing system (which employs thermal inkjet technology), many other printing techniques can be used in connection with the ink compositions of interest including the alternatives mentioned above.

It shall be understood that the method associated with this embodiment will employ the same steps listed above in connection with the prior embodiment except for one item, namely, the manner in which the invisible printed image is detected. Regarding the preliminary stages of the claimed process which occur prior to viewing or otherwise detecting the invisible printed image, the information presented above in connection with the first embodiment shall be incorporated by reference in this section. The use of common reference numbers in FIGS. 2–3 will signify process steps and materials that are equally applicable to both embodiments. However, to provide a full and enabling disclosure, a brief overview of the claimed procedure from start to finish will now be provided.

With reference to FIG. 3, a thermal inkjet printing unit 200 is again illustrated which is used as the printing apparatus in this embodiment. Exemplary commercial systems associated with the printing unit 200 are discussed above. A thermal inkjet cartridge unit (e.g. cartridge 10 shown in FIG. 1) is likewise positioned within the printing unit 200 which is supplied with an ink composition 32. In this embodiment, the ink composition 32 will involve Ink Composition No. 2 which includes as active ingredients (1) at least one uncomplexed invisible metal phthalocyanine far red/infrared fluorophore (particularly chloroaluminum [III] phthalocyanine tetrasulfonic acid or salts thereof which provide unexpectedly superior results); and (2) at least one invisible ultraviolet fluorophore (with examples thereof being presented above in Section "B"). Again, many different inkjet and non-inkjet cartridge types (e.g. "ink delivery systems") may be employed in the processes described herein, with these systems including a housing, a printhead in fluid communication with the housing (which contains an ink storage/retaining chamber therein), and at least one ink ejector in the printhead. Regarding specific thermal inkjet cartridges which can be used as the ink cartridge unit 10 in this embodiment, the invention shall not be limited in this respect. Representative commercially-available cartridge units suitable for this purpose are the same as those listed above in connection with the first embodiment. All of the methods discussed herein shall likewise be equally applicable to ink delivery systems which employ (1) a printhead directly attached to the ink-containing housing; and (2) a printhead operatively connected via one or more tubular conduits to a remotely-positioned housing having an ink supply therein as noted above.

Next, a substrate 202 of the type previously discussed is provided and inserted (e.g. placed) into the printing unit 200. The top surface 204 of the substrate 202 faces upwardly toward the ink cartridge 10. Many different materials may be used to produce the substrate 202 including, without limitation, paper (coated or uncoated), metal, plastic film materials (made of, for example, polyester resins, polycarbonate products, polyethylene compounds, and others), glass, and the like. In this regard, the ink compositions and methods associated with this embodiment shall be not restricted to any given substrate materials which may again be employed in sheet, strip, roll, or other forms without limitation. As schematically illustrated in the embodiment of FIG. 3, the printing unit 200 is electrically connected to an image generating apparatus 208 which may involve many different systems. Representative systems which can be used as the image generating apparatus 208 are the same as those listed above in connection with the first embodiment including personal computers, scanners, bar code generators, and the like.

The image generating apparatus 208 and the printing unit 200 are then cooperatively activated in order to deliver the desired invisible printed image 210 (shown in phantom lines in FIG. 3) onto the top surface 204 of the substrate 202. The printed image 210 can involve a bar-code as illustrated in FIG. 3 or any other desired indicia. Both the image generating apparatus 208 and the printing unit 200 are used to selectively control the ink cartridge 10. The printing process is initiated by activation of the ink ejectors (e.g. thin-film resistors 86) in the printhead 80 of the ink cartridge 10 (See FIG. 1). The term "activation" in the system of FIG. 3 shall again involve a process in which the thin-film resistors 86 of the ink cartridge 10 are directed by the printing unit 200 to deliver the ink composition 32 from the compartment/chamber 30 of the housing 12 onto the top surface 204 of the substrate 202. This is achieved by energizing the thin film resistors 86 in the printhead 80 of the cartridge 10. As a result, ink residing beneath the orifice plate 104 is thermally excited and expelled outwardly through the ink ejection orifices 108 in the plate 104 and onto the image-receiving substrate 202. In this manner, the cartridge 10 may be used to deliver the invisible printed image 210 to the substrate 202 using ink composition 32. The invisible printed image 210 is characterized as being "invisible" because it again cannot be viewed by the unaided eye in "normal", "ambient", or "white" light as previously defined. Likewise, in accordance with the unique and specialized chemical components within the ink composition 32 (namely, Ink Composition No. 2), the invisible printed image 210 is stable (e.g. waterfast/lightfast) with a high resolution level. Again, the materials and processes discussed in this alternative embodiment are appropriate for at least 600 dpi printing at a frequency of about 12–16 kHz or more.

At this point, the substrate 202 containing the invisible printed image 210 thereon is preferably removed from the printing unit 200 and illuminated with light having a wavelength sufficient to cause the ink composition 32 to emit fluorescent light therefrom. The system operator in the present embodiment now has a choice as to the type and manner of illumination which will be used to accomplish illumination/detection. The first option involves a procedure which is substantially the same as the process described above in the first embodiment. Specifically, the invisible printed image 210 produced from the ink composition 32 is illuminated by applying far red or infrared light onto the printed image 210 to generate fluorescent light. Far red light normally involves a wavelength range of about 650–700 nm, with infrared light involving a range which exceeds about 700 nm up to about 1000 nm as noted above. However, in a preferred and non-limiting embodiment designed to produce optimum results, the applied light is preferably within a wavelength range of about 650–715 nm (with a range of about 660–690 nm being best). As a result of this step, the ink composition 32 and invisible printed image 210 produced therefrom will emit far red or infrared fluorescent light. This light will optimally be within a non-limiting wavelength range of about 670–720 (preferred=about 670–710 nm) when the chemical materials discussed herein are used (including but not limited to chloroaluminum [III] phthalocyanine tetrasulfonic acid or salts thereof.) A far red/infrared illumination system 212 is schematically illustrated in FIG. 3 which may be employed to deliver far red/infrared light 214 within the foregoing wavelength range to the substrate 202 and invisible printed image 210. Many different light sources may be used in connection with the illumination system 212 (including standard red LED ["light-emitting diode"] light delivery systems, halogen bulb illuminators, metal halide bulb units, and other comparable systems which are known in the art for infrared imaging). While this embodiment shall not be restricted to any particular systems for this purpose, exemplary commercial illuminators which can be employed as the illumination system 212 include the specific products mentioned above in connection with the previous embodiment.

When the illumination system 212 is used to deliver far red/infrared light 214 to the invisible printed image 210 on the substrate 202, it will fluoresce to produce a fluorescent printed image designated at reference number 218 in FIG. 3. However, the fluorescent printed image 218 will not fluoresce in a manner which is visible to the unaided eye. Instead, it will fluoresce by producing far red or infrared light within an optimal, non-limiting wavelength range of about 670–720 nm (best=about 670–710 nm) in accordance with the specific materials used to produce the ink composition 32 including the metal phthalocyanine far red/infrared fluorophore, with particular reference to chloroaluminum (III) phthalocyanine tetrasulfonic acid and salts thereof. To detect or otherwise characterize the fluorescent printed image 218 on the top surface 204 of the substrate 202, an appropriate detecting system 220 is provided. The detecting system 220 may involve many different devices and components without limitation. For example, the system 220 schematically shown in FIG. 3 again consists of a standard CCD ("charge coupled device") camera 222 which is fitted with an appropriate infrared filter 224 of known construction (e.g. a conventional 700 nm long pass filter in a representative, non-limiting example). Other camera systems are also suitable for use herein, with the foregoing arrangement of components being provided for example purposes only. Representative commercially-available detection devices which may be used in connection with the camera 222 include but are not limited to the commercially-available camera units discussed above in connection with the first embodiment.

The specific embodiment of FIG. 3 is particularly designed to read and otherwise detect bar-code images. Once the camera 222 is activated, the resulting electronic images are directed into an image processor 230 schematically shown in FIG. 3. The image processor 230 can involve many different systems without limitation including those which are designed to detect, interpret, and characterize bar code information. An exemplary commercial apparatus which is suitable for this purpose includes the same representative system previously described in connection with the prior embodiment. Likewise, many different devices may be used as the image processor 230 ranging from bar code readers to video monitors which are designed to produce visually-observable images from signals generated by the camera 222. Regardless of which components are employed within the detecting system 220, it will enable the fluorescent printed image 218 to be detected on-demand in a highly effective manner, thus completing the far red/infrared image generating and monitoring process.

The production of invisible printed images in accordance with this embodiment (which employs Ink Composition No. 2) enables clear and stable printed images to be generated. Of particular value is the ability to accomplish these goals using many different printing systems including high-speed thermal inkjet units. The resulting images in this alternative embodiment are again characterized by high resolution and throughput, excellent stability (including waterfastness and lightfastness), and the ability to fluoresce with a considerable degree of intensity.

In accordance with the unique dual-fluorophore character of Ink Composition No. 2, the invisible printed image 210 can likewise be viewed by ultraviolet illumination (FIG. 3). To accomplish this goal, the invisible printed image 210 produced from the ink composition 32 is illuminated by applying ultraviolet light onto the image 210. Ultraviolet light, as noted above, traditionally involves a wavelength range of about 250–400 nm, with the light to be applied in this embodiment optimally being within a non-limiting wavelength range of about 250–380 nm. With continued reference to FIG. 3, an ultraviolet illumination system 240 is schematically illustrated which may be used to deliver ultraviolet light 242 to the substrate 202 and printed image 210. Many different devices may be employed in connection with the ultraviolet illumination system 212 including but not limited to known ultraviolet illuminators and/or conventional "blacklight" systems. Representative commercially available ultraviolet devices suitable for use in this embodiment include illuminators sold by the Cole-Parmer Co. of Vernon Hills, Ill. (USA)—model UVGL-58; and Nikon of Japan under the name "Metal Halide Fiber Optic Illuminator".

To view the fluorescent printed image (designated at reference number 244 in FIG. 3) on the top face 204 of the substrate 202, no special equipment is required. This situation exists because the light emitted by the fluorescent printed image 244 will have an optimal, non-limiting wavelength of about 400–650 nm which is, in effect, visible to the unaided eye without special observation equipment. Likewise, in accordance with the visible nature of the printed image 244, it may also be viewed with a conventional video camera system (not shown).

The production of invisible printed images using this particular embodiment (which employs Ink Composition No. 2) provides the same benefits listed above, along with the generation of clearly defined ultraviolet images. Of particular value is the ability to accomplish these goals using many different printing systems including high-speed thermal inkjet units. The resulting images are again characterized by high resolution and throughput, excellent stability (including waterfastness and lightfastness), and the ability to fluoresce with a considerable degree of intensity.

As described herein, the claimed ink compositions and printing methods overcome numerous problems associated with prior invisible ink systems and provide many advantages including but not limited to (1) high print quality levels (particularly when thermal inkjet technology is employed); (2) superior lightfastness and waterfastness; (3) excellent fluorescence intensity during illumination with an appropriate light source; and (4) a high level of reliability when used in connection with inkjet printing systems (particularly those which employ thermal inkjet technology). Accordingly, the present invention represents an advance in invisible ink imaging technology which satisfies a long-felt need as noted herein.

Having set forth preferred embodiments of the invention, it is anticipated that suitable modifications may be made thereto by individuals skilled in the relevant art which nonetheless remain within the scope of the invention. For example, the invention shall not be limited to any particular ink formulations, printing equipment, applied light wavelength ranges, emitted light wavelength ranges, and imaging steps within the general parameters set forth above unless otherwise noted. In this regard, the invention shall only be construed in accordance with the following claims.

The invention that is claimed is:

1. A method for producing an invisible printed image on a substrate and thereafter causing said printed image to fluoresce comprising:
    providing an ink delivery system comprising:
        a housing comprising at least one ink retaining chamber therein, said ink retaining chamber comprising a supply of an invisible ink composition therein, said ink composition comprising an invisible dye comprised of at least one uncompleted invisible metal phthalocyanine fluorophore which absorbs light within a wavelength range of about 650–715 nm and emits light within a wavelength range of about 670–720 nm, said ink composition further comprising an ink vehicle comprised of water and at least one organic solvent; and
        a printhead operatively connected to said ink retaining chamber in said housing, said printhead comprising at least one ink ejector for expelling said invisible ink composition on-demand from said ink retaining chamber;
    providing a substrate;
    activating said printhead of said ink delivery system in order to deliver said invisible ink composition from said ink retaining chamber onto said substrate; and
    applying light having a wavelength of about 650–715 nm to said invisible ink composition on said substrate, said applying of said light causing said ink composition to emit fluorescent light having a wavelength of about 670–720 nm.

2. A method for producing an invisible printed image on a substrate and thereafter causing said printed image to fluoresce comprising:
    providing an ink delivery system comprising:
        a housing comprising at least one ink retaining chamber therein, said ink retaining chamber comprising a supply of an invisible ink composition therein, said ink composition comprising an invisible dye comprised of a phthalocyanine fluorophore selected from the group consisting of chloroaluminum (III) phthalocyanine tetrasulfonic acid and salts thereof, said ink composition further comprising an ink vehicle comprised of water and at least one organic solvent; and
        a printhead operatively connected to said ink retaining chamber in said housing, said printhead comprising at least one ink ejector for expelling said invisible ink composition on-demand from said ink retaining chamber;
    providing a substrate;
    activating said printhead of said ink delivery system in order to deliver said invisible ink composition from said ink retaining chamber onto said substrate; and
    applying light to said invisible ink composition on said substrate having a wavelength sufficient to cause said ink composition to emit fluorescent light therefrom.

3. The method of claim 2 wherein said light applied to said invisible ink composition on said substrate has a wavelength range of about 650–715 nm, with said fluorescent light having a wavelength range of about 670–720 nm.

4. A method for producing an invisible printed image on a substrate and thereafter causing said printed image to fluoresce comprising:
    providing an ink delivery system comprising:
        a housing comprising at least one ink retaining chamber therein, said ink retaining chamber comprising a supply of an invisible ink composition therein, said ink composition comprising a first invisible dye comprised of at least one uncomplexed invisible metal phthalocyanine fluorophore which absorbs light within a wavelength range of about 650–715 nm and emits light within a wavelength range of about 670–720 nm, and a second invisible dye comprised of at least one invisible ultraviolet fluorophore, said ink composition further comprising an ink vehicle comprised of water and at least one organic solvent; and
        a printhead operatively connected to said ink retaining chamber in said housing, said printhead comprising at least one ink ejector for expelling said invisible ink composition on-demand from said ink retaining chamber;
    providing a substrate;
    activating said printhead of said ink delivery system in order to deliver said invisible ink composition from said ink retaining chamber onto said substrate; and
    applying light to said invisible ink composition on said substrate having a wavelength sufficient to cause said ink composition to emit fluorescent light therefrom.

5. The method of claim 4 wherein said light applied to said invisible ink composition on said substrate has a wavelength range of about 650–715 nm, with said fluorescent light having a wavelength range of about 670–720 nm.

6. The method of claim 4 wherein said light applied to said invisible ink composition on said substrate has a wavelength range of about 250–380 nm, with said fluorescent light having a wavelength range of about 400–650 nm.

7. The method of claim 4 wherein said ultraviolet fluorophore is selected from the group consisting of at least one ultraviolet absorbing stilbene, pyrazoline, coumarin, carbostyril, and pyrene compound.

8. A method for producing an invisible printed image on a substrate and thereafter causing said printed image to fluoresce comprising:

providing an ink delivery system comprising:
a housing comprising at least one ink retaining chamber therein, said ink retaining chamber comprising a supply of an invisible ink composition therein, said ink composition comprising a first invisible dye comprised of a phthalocyanine fluorophore selected from the group consisting of chloroaluminum (III) phthalocyanine tetrasulfonic acid and salts thereof, a second invisible dye comprised of at least one ultraviolet fluorophore, and an ink vehicle comprised of water and at least one organic solvent; and
a printhead operatively connected to said ink retaining chamber in said housing, said printhead comprising at least one ink ejector for expelling said invisible ink composition on-demand from said ink retaining chamber;

providing a substrate;

activating said printhead of said ink delivery system in order to deliver said invisible ink composition from said ink retaining chamber onto said substrate; and applying light to said invisible ink composition on said substrate having a wavelength sufficient to cause said ink composition to emit fluorescent light therefrom.

9. The method of claim 8 wherein said light applied to said invisible ink composition on said substrate has a wavelength range of about 650–715 nm, with said fluorescent light having a wavelength range of about 670–720 nm.

10. The method of claim 8 wherein said light applied to said invisible ink composition on said substrate has a wavelength range of about 250–380 nm, with said fluorescent light having a wavelength range of about 400–650 nm.

11. The method of claim 8 wherein said ultraviolet fluorophore is selected from the group consisting of at least one ultraviolet absorbing stilbene, pyrazoline, coumarin, carbostyril, and pyrene compound.

12. The method of claim 1 wherein said ink composition in said ink delivery system comprises about 0.0001–0.02% by weight said phthalocyanine fluorophore.

13. A method for producing an invisible printed image on a substrate and thereafter causing said printed image to fluoresce comprising:

providing an ink delivery system comprising:
a housing comprising at least one ink retaining chamber therein, said ink retaining chamber comprising a supply of an invisible ink composition therein, said ink composition comprising a phthalocyanine fluorophore selected from the group consisting of chloroaluminum (III) phthalocyanine tetrasulfonic acid and salts thereof, 1,5-pentanediol, 2-ethyl-2-hydroxymethyl-1,3-propanediol, 1,3-propanediol, at least one surfactant, and water; and
a printhead operatively connected to said ink retaining chamber in said housing, said printhead comprising at least one ink ejector for expelling said invisible ink composition on-demand from said ink retaining chamber;

providing a substrate;

activating said printhead of said ink delivery system in order to deliver said invisible ink composition from said ink retaining chamber onto said substrate; and applying light to said invisible ink composition on said substrate having a wavelength sufficient to cause said ink composition to emit fluorescent light therefrom.

14. A method for producing an invisible printed image on a substrate and thereafter causing said printed image to fluoresce comprising:

providing an ink delivery system comprising:
a housing comprising at least one ink retaining chamber therein, said ink retaining chamber comprising a supply of an invisible ink composition therein, said ink composition comprising a phthalocyanine fluorophore selected from the group consisting of chloroaluminum (III) phthalocyanine tetrasulfonic acid and salts thereof, an ultraviolet fluorophore comprised of benzenesulfonic acid-2,2'-(1,2-ethenediyl)bis[5-[4-bis(2-hydroxyethyl)amino]-6-[(4-sulfophenyl)amino]-1,3,5-triazin-2yl]aminotetrasodium salt, 1,5-pentanediol, 2-ethyl-2-hydroxymethyl-1,3-propanediol, 1,3-propanediol, at least one surfactant, and water; and
a printhead operatively connected to said ink retaining chamber in said housing, said printhead comprising at least one ink ejector for expelling said invisible ink composition on-demand from said ink retaining chamber;

providing a substrate;

activating said printhead of said ink delivery system in order to deliver said invisible ink composition from said ink retaining chamber onto said substrate; and applying light to said invisible ink composition on said substrate having a wavelength sufficient to cause said ink composition to emit fluorescent light therefrom.

* * * * *

UNITED STATES PATENT AND TRADEMARK OFFICE
CERTIFICATE OF CORRECTION

PATENT NO. : 6,513,921 B1
DATED : February 4, 2003
INVENTOR(S) : Houle

It is certified that error appears in the above-identified patent and that said Letters Patent is hereby corrected as shown below:

Column 35,
Line 52, delete "uncompleted" and insert therefor -- uncomplexed --.

Signed and Sealed this

Third Day of February, 2004

JON W. DUDAS
*Acting Director of the United States Patent and Trademark Office*